United States Patent
Fischer et al.

(10) Patent No.: US 8,496,416 B1
(45) Date of Patent: Jul. 30, 2013

(54) METHOD AND APPARATUS FOR DRILLING OPERATIONS

(75) Inventors: Allen H. Fischer, Creve Couer, MO (US); Raymond J. Slesinski, Arnold, MO (US)

(73) Assignee: The Boeing Company, Chicago, IL (US)

( * ) Notice: Subject to any disclaimer, the term of this patent is extended or adjusted under 35 U.S.C. 154(b) by 1083 days.

(21) Appl. No.: 12/469,866

(22) Filed: May 21, 2009

(51) Int. Cl.
*B23B 49/02* (2006.01)
*B23B 47/04* (2006.01)
*B23B 47/18* (2006.01)

(52) U.S. Cl.
USPC ............ 408/76; 408/80; 408/126; 408/129; 408/141

(58) Field of Classification Search
USPC ............... 408/76, 79, 80, 126, 127, 129, 141
IPC .................... B23B 49/02, 47/04, 47/18
See application file for complete search history.

(56) References Cited

U.S. PATENT DOCUMENTS

| | | | | |
|---|---|---|---|---|
| 836,212 A * | 11/1906 | Pierce et al. | ............ | 408/114 |
| 1,403,991 A * | 1/1922 | Vedovelli | ............ | 408/126 |
| 2,414,637 A * | 1/1947 | Crump | ............ | 173/213 |
| 3,804,544 A * | 4/1974 | Adams | ............ | 408/14 |
| 3,835,858 A * | 9/1974 | Hagen | ............ | 606/180 |
| 4,179,231 A | 12/1979 | Hadden | | |
| 4,288,182 A * | 9/1981 | Vandenkieboom et al. | .. | 408/129 |
| 4,347,450 A * | 8/1982 | Colligan | ............ | 310/50 |
| 4,358,228 A * | 11/1982 | Stark | ............ | 408/35 |
| 4,365,916 A * | 12/1982 | Miyakawa | ............ | 408/46 |
| 4,717,303 A * | 1/1988 | Kawai | ............ | 414/4 |
| 4,890,962 A | 1/1990 | Nydegger | | |
| 5,361,504 A | 11/1994 | Huang | | |
| 5,947,654 A * | 9/1999 | Blankenship et al. | ...... | 408/72 B |
| 6,074,394 A | 6/2000 | Krause | | |
| 6,102,632 A | 8/2000 | Potter et al. | | |
| 6,196,772 B1 * | 3/2001 | Thames et al. | ............ | 408/1 R |
| 6,296,427 B1 | 10/2001 | Potter et al. | | |
| 6,322,298 B1 * | 11/2001 | Wada | ............ | 408/127 |
| 7,918,230 B2 * | 4/2011 | Whitman et al. | ............ | 128/898 |
| 8,167,518 B2 * | 5/2012 | Mathis et al. | ............ | 408/1 R |
| 2008/0056833 A1 * | 3/2008 | Lay et al. | ............ | 408/76 |

FOREIGN PATENT DOCUMENTS

EP 420212 A2 * 4/1991

OTHER PUBLICATIONS

"M-10iA Series", FANUC Robotics, 3 pages, retrieved May 12, 2009 http://www.fanucrobotics.com.

\* cited by examiner

*Primary Examiner* — Eric A Gates
(74) *Attorney, Agent, or Firm* — Yee & Associates, P.C.

(57) ABSTRACT

An apparatus may include a housing, a spindle system located in the housing, a tool guide associated with the housing, and a magnetic unit associated with the housing. The spindle system may be capable of rotating a tool about an axis of rotation. The tool guide may be capable of engaging a receptacle at a location on a workpiece. The magnetic unit may be capable of securing the tool guide in the receptacle when the tool guide is engaged with the receptacle.

28 Claims, 13 Drawing Sheets

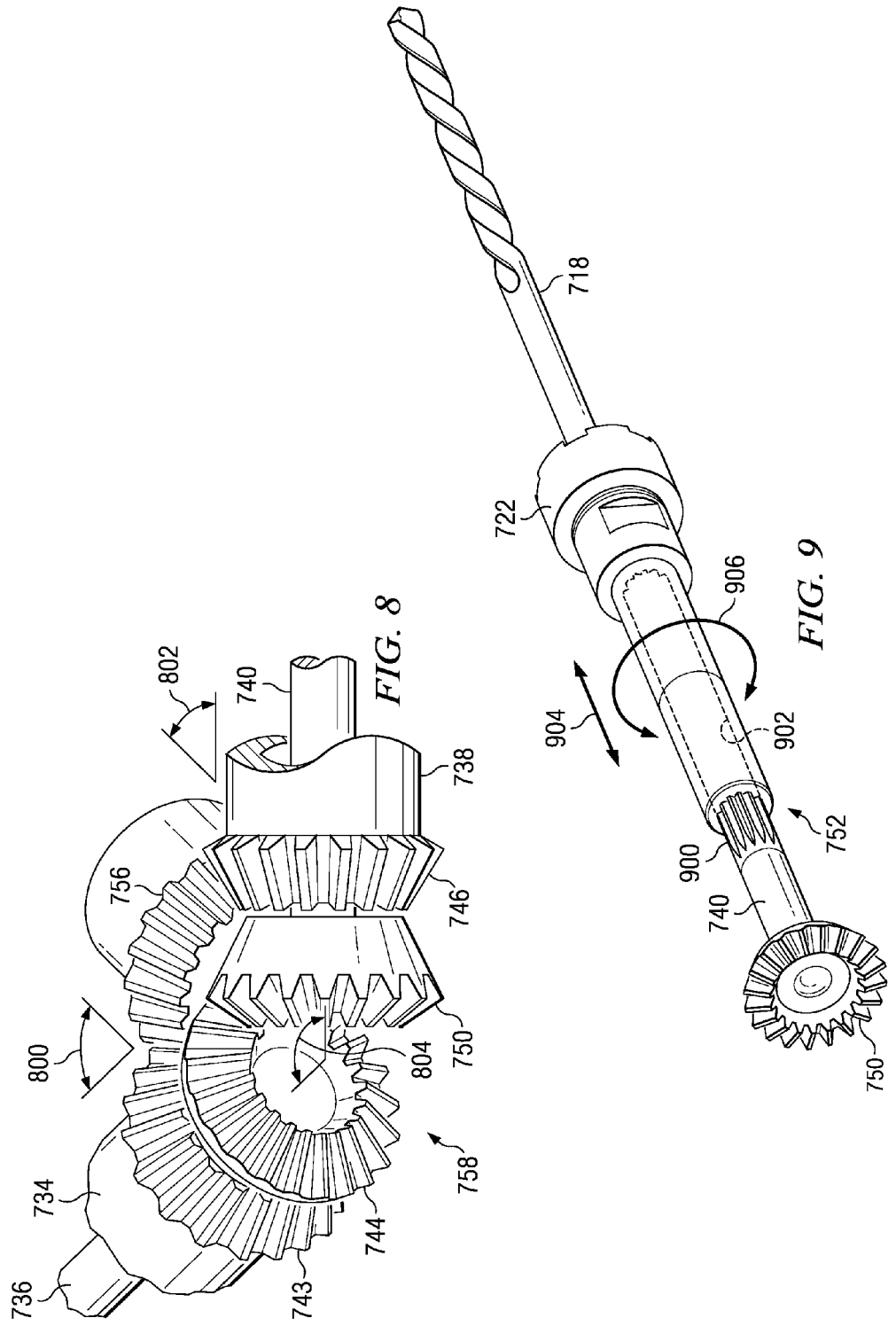

METHOD AND APPARATUS FOR DRILLING OPERATIONS

BACKGROUND INFORMATION

1. Field

The present disclosure relates generally to manufacturing and, in particular, to drilling holes. Still more particularly, the present disclosure relates to a method and apparatus for automatically drilling holes.

2. Background

In manufacturing aircraft, numerous holes may be drilled in aircraft parts to assemble the parts to form the aircraft. For example, holes may be drilled in skin panels for fasteners to attach the skin panels to spars and/or ribs for the frame of the aircraft. As another example, holes may be drilled in various structures and substructures to receive fasteners to assemble and secure those parts to each other. Holes may be drilled in metal and/or composite parts for the aircraft.

Oftentimes, in assembling an aircraft, holes may be drilled in parts located in confined spaces. These spaces may be difficult to access and/or inaccessible by many automated or robotic processes. Currently, robotic drilling systems may be used for drilling holes on external mold line surfaces, such as skin panels.

With more confined areas, such as inside a wing box, holes may be drilled in these and other structures using portable drilling tools. These tools may be operated by human operators and may be powered using air motors.

With confined areas, access to perform drilling operations may still be difficult even while using portable drilling tools operated by human operators. Further, the ergonomics also may be less than ideal. For example, an operator may need to reach a location that requires positioning a handheld tool that requires the operator to be off balance. Further, manipulation of the tool may be more difficult because of the weight and air hoses attached to a portable drill. The process of assembling an aircraft also may require more time and increase the expense because data about the holes may not be automatically collected by the human operator when operating handheld tools. This data often is collected after the holes have been drilled.

Therefore, it would be advantageous to have a method and apparatus that takes into account at least some of the issues described above, as well as possibly other issues.

SUMMARY

One advantageous embodiment may provide an apparatus comprising a housing, a spindle system, a tool guide, and a magnetic unit. The spindle system may be located in the housing. The spindle system may be capable of rotating a tool about an axis of rotation. The tool guide may be associated with the housing. The tool guide may be capable of engaging a receptacle at a location on a workpiece. The magnetic unit may be associated with the housing, wherein the magnetic unit may be capable of securing the tool guide in the receptacle when the tool guide is engaged with the receptacle.

In another advantageous embodiment, a drilling apparatus for drilling holes in a workpiece for an aircraft may comprise a housing, a spindle system, a nosepiece, a tool guide, a magnetic unit, a channel, a first drive shaft system, a second drive shaft system, a first gear system, a spline system, a collet, a fifth drive shaft, a sixth drive shaft, a second gear system, a robotic arm, a first motor, and a second motor. The housing may have a first section and a second section. The second section may extend at an angle from the first section. The spindle system may be located in the housing and may be capable of rotating a drill bit about an axis of rotation. The nosepiece may be capable of being attached to the housing. The tool guide may be associated with the housing. The tool guide may have a base and a tapered end. The tapered end may be capable of engaging a receptacle in a location on the workpiece. The magnetic unit may be associated with the housing and may be capable of securing the tool guide in the receptacle when the tool guide is engaged with the receptacle. The tool guide may be attached to the nosepiece, and the magnetic unit may be located in the nosepiece. The magnetic unit may be adjacent to the base. The channel may extend through the tool guide and the magnetic unit and may be capable of receiving the drill bit. The first drive shaft system may be located within the housing. The first drive shaft system may have a first drive shaft located within a first section and a second drive shaft located within a second section. The second drive shaft system may be located within the housing. The second drive shaft system may have a third drive shaft, wherein the first drive shaft may be located within the third drive shaft, and a fourth drive shaft, wherein the second drive shaft may be located within the fourth drive shaft. The first drive shaft may be rotatable within the third drive shaft, and the second drive shaft may be rotatable within the fourth drive shaft. The first gear system may be located in the housing. The first gear system may couple the first drive shaft to the second drive shaft and the third drive shaft to the fourth drive shaft. The first drive shaft system may be capable of rotating the drill bit around the axis of rotation, and the second drive shaft system may be capable of moving the drill bit along the axis of rotation. The first gear system may comprise a first gear connected to a first end of the first drive shaft, a second gear connected to a first end of the third drive shaft, a third gear connected to a first end of the second drive shaft, a fourth gear connected to a first end of the fourth drive shaft, and a fifth gear connected to the second gear and the fourth gear. The first gear may be coupled to the third gear, and the fifth gear may be coupled to the second gear and the fourth gear. A second end of the second drive shaft may be capable of being coupled to the drill bit. The spline system may have a first end and a second end. The first end of the spline system may be connected to the second end of the second drive shaft, and the second end of the spline system may be connected to a second end of the fourth drive shaft. The second drive shaft may be capable of rotating the spline system about the axis of rotation, and the fourth drive shaft may be capable of moving the spline system along the axis of rotation. The collet may be connected to the second end of the spline system and may be capable of receiving and holding the drill bit. The fifth drive shaft may be located inside the sixth drive shaft. The second gear system may couple the first drive shaft to the fifth drive shaft and the third drive shaft to the sixth drive shaft. The fifth drive shaft and the sixth drive shaft may be located in the robotic arm. The first motor may be connected to the fifth drive shaft and may be capable of rotating the first drive shaft and the second drive shaft. The second motor may be connected to the sixth drive shaft and may be capable of rotating the third drive shaft and the fourth drive shaft. The first motor and the second motor may be located on the robotic arm.

In yet another advantageous embodiment, an apparatus may comprise a housing, a first drive shaft system, a second drive shaft system, and a gear system. The housing may have a first section and a second section. The second section may extend at an angle from the first section. The first drive shaft system may be located within the housing. The first drive shaft system may have a first drive shaft located within the first section and a second drive shaft located within the second section. The second drive shaft system may be located within the housing. The second drive shaft system may have a third drive shaft, wherein the first drive shaft may be located within the third drive shaft, and a fourth drive shaft, wherein the second drive shaft may be located within the fourth drive shaft. The first drive shaft may be rotatable within the third drive shaft, and the second drive shaft may be rotatable within the fourth drive shaft. The gear system may be located in the housing. The gear system may couple the first drive shaft to the second drive shaft and the third drive shaft to the fourth drive shaft. The first drive shaft system may be capable of rotating a tool around an axis of rotation, and the second drive shaft system may be capable of moving the tool along the axis of rotation. In still yet another advantageous embodiment, a drilling apparatus for drilling holes in a workpiece for an aircraft may comprise a housing, a first drive shaft system located within the housing, a second drive shaft system located within the housing, a spindle system located within the housing, a nosepiece associated with the housing, a tool guide associated with the housing, a magnetic unit associated with the housing, a first gear system located in the housing, a spline system, a collet, a fifth drive shaft, a sixth drive shaft, a second gear system, a first motor, a second motor, and a robotic arm. The housing may have a first section and a second section, wherein the second section may extend at an angle from the first section. The first drive shaft system may have a first drive shaft located within the first section and a second drive shaft located within the second section. The second drive shaft system may have a third drive shaft, wherein the first drive shaft may be located within the third drive shaft, and a fourth drive shaft, and wherein the second drive shaft may be located within the fourth drive shaft. The first drive shaft may be rotatable within the third drive shaft, and the second drive shaft may be rotatable within the fourth drive shaft. The spindle system may be capable of rotating a tool about an axis of rotation. The tool guide may be capable of engaging a receptacle at a location on a workpiece. The magnetic unit may be capable of securing the nosepiece in the receptacle when the tool guide is engaged with the receptacle. The first gear system may couple the first drive shaft to the second drive shaft and the third drive shaft to the fourth drive shaft. The first drive shaft system may be capable of rotating a drill bit about an axis of rotation, and the second drive shaft system may be capable of moving the drill bit along the axis of rotation. The first gear system may comprise a first gear connected to a first end of the first drive shaft, a second gear connected to a first end of the third drive shaft, a third gear connected to a first end of the second drive shaft, and a fifth gear. The first gear may be coupled to the third gear, and the fifth gear may be coupled to the second gear and the fourth gear. The spline system may have a first end and a second end. The first end of the spline system may be connected to the second end of the second drive shaft, and the second end of the spline system may be connected to a second end of the fourth drive shaft. The second drive shaft may be capable of rotating the spline system about the axis of rotation, and the fourth drive shaft may be capable of moving the spline system along the axis of rotation. The collet may be connected to the second end of the spline system and may be capable of receiving and holding the drill bit. The fifth drive shaft may be located inside the sixth drive shaft. The second gear system may couple the first drive shaft to the fifth drive shaft and the third drive shaft to the sixth drive shaft. The first motor may be connected to the fifth drive shaft and may be capable of rotating the first drive shaft and the fifth drive shaft. The second motor may be connected to the sixth drive shaft and may be capable of rotating the third drive shaft and the sixth drive shaft. The fifth drive shaft and the sixth drive shaft may be located in the robotic arm. The robotic arm may be configured to receive the housing.

In another advantageous embodiment, a method may be present for performing an operation on a workpiece. An end effector may be aligned with a location for a hole. The end effector may comprise a housing, a spindle system, a tool guide, and a magnetic unit. The spindle system may be located in the housing. The spindle system may be capable of rotating a tool about an axis of rotation. The tool guide may be associated with the housing. The tool guide may be capable of engaging a receptacle in a location on the workpiece. The magnetic unit may be associated with the housing. The magnetic unit may be capable of securing the nosepiece in the receptacle when the tool guide is engaged with the receptacle. An operation may be performed at the location with the end effector.

In yet another advantageous embodiment, a method may be present for drilling a hole in a workpiece for an aircraft. A layer of material with a number of receptacles may be placed onto the workpiece. A tool guide for an end effector may be placed into a receptacle at a location for the hole. The end effector may comprise a housing, a spindle system, a tool guide, a nosepiece, and a magnetic unit. The spindle system may be located in the housing. The spindle system may be capable of rotating a tool about an axis of rotation. The tool guide may be associated with the housing. The tool guide may be capable of engaging a receptacle in a location on the workpiece. The magnetic unit may be associated with the housing. The magnetic unit may be capable of securing the nosepiece in the receptacle by magnetically attaching the nosepiece to the receptacle when the tool guide is engaged with the receptacle. A drilling operation may be performed at the location with the end effector engaged with the receptacle.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 8 is an illustration of a perspective view of a gear system in an end effector in accordance with an advantageous embodiment;

FIG. 9 is a more detailed illustration of a spline system within an end effector in accordance with an advantageous embodiment;

DETAILED DESCRIPTION

Figure 1:
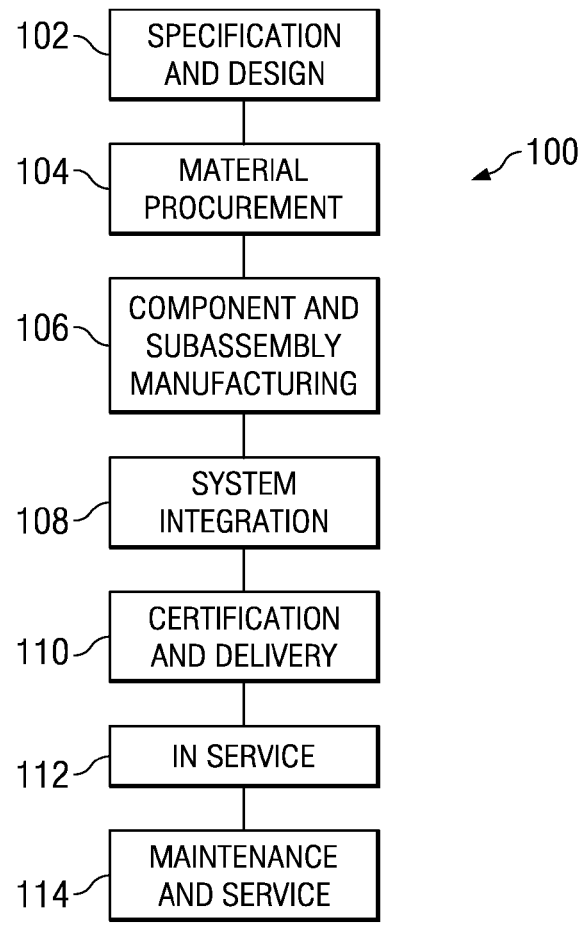
FIG. 1 is an illustration of an aircraft manufacturing and service method in accordance with an advantageous embodiment.
Figure 2:
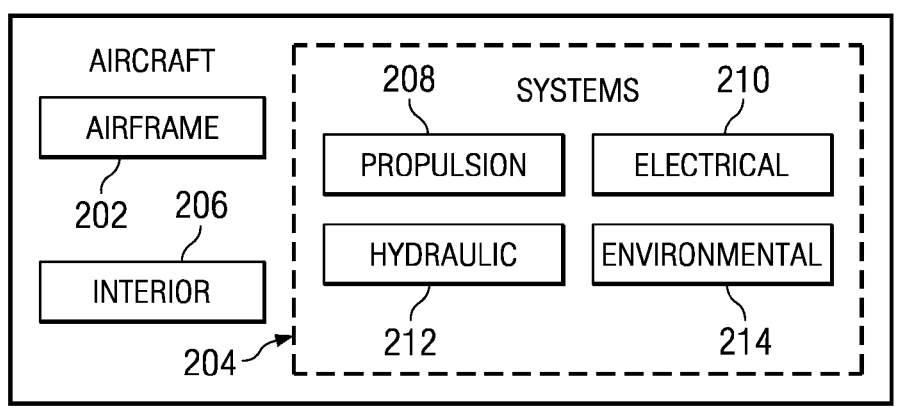
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200.

For example, the different advantageous embodiments may be implemented to perform operations in aircraft manufacturing service method 100 during at least one of component and subassembly manufacturing 106, system integration 108, and maintenance and service 114 to perform operations. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

The different advantageous embodiments recognize and take into account a number of different considerations. For example, the different advantageous embodiments recognize and take into account that the current practice of employing human operators with portable drilling tools to drill holes may increase the expense and time needed to assemble parts in manufacturing an aircraft. Further, the different advantageous embodiments also recognize and take into account that currently used robotic drilling systems may be too bulky to access confined spaces to perform drilling operations in an aircraft.

Currently used drilling end effectors may employ electric motors, hydraulic systems, air motors, or piston actuators to power the drill. These different motors and systems rotate the drill bit about an axis of rotation, as well as move the drill bit along the axis of rotation. These different motors and systems are currently located in or on the end effector. In some cases, a robotic arm may provide the movement along the axis of rotation in a manner that reduces the need for a motor or piston for that type of movement.

The motors that remain, however, may still take up more space than desired when placed on the end effector. Further, the additional weight of the motors may reduce the capability of a robotic drilling system to accurately position the end effector. Although smaller robotic arms may be used to drive feed motions, these motions may be too compliant, resulting in the drill bit being forced away from the hole and/or allowing the drill bit to travel along the surface during a drilling operation. This travelling of the drill bit may include, for example, without limitation, skipping along the surface, sliding along the surface, and/or other undesirable movement of the drill bit along the surface during the drilling operation.

Therefore, the different advantageous embodiments provide a method and apparatus for performing drilling operations. In one advantageous embodiment, an apparatus may comprise a housing, a spindle system, a tool guide, and a magnetic unit. The spindle system may be located in the housing, in which the spindle system may be capable of rotating a tool about an axis of rotation. The tool guide may be associated with the housing.

The tool guide may be capable of engaging a receptacle located in a location on a workpiece. The magnetic unit may be capable of securing a nosepiece and the tool guide in the receptacle when the nosepiece and tool guide are engaged with the receptacle. In the different advantageous embodiments, a spindle system may be configured to allow for the motors to be located outside of and/or not connected directly to the end effector. Further, the different advantageous embodiments may include a number of gear systems that allow the motors to remotely rotate and move a tool in the end effector. These and other features for the different advantageous embodiments are described in more detail below.

Figure 3:
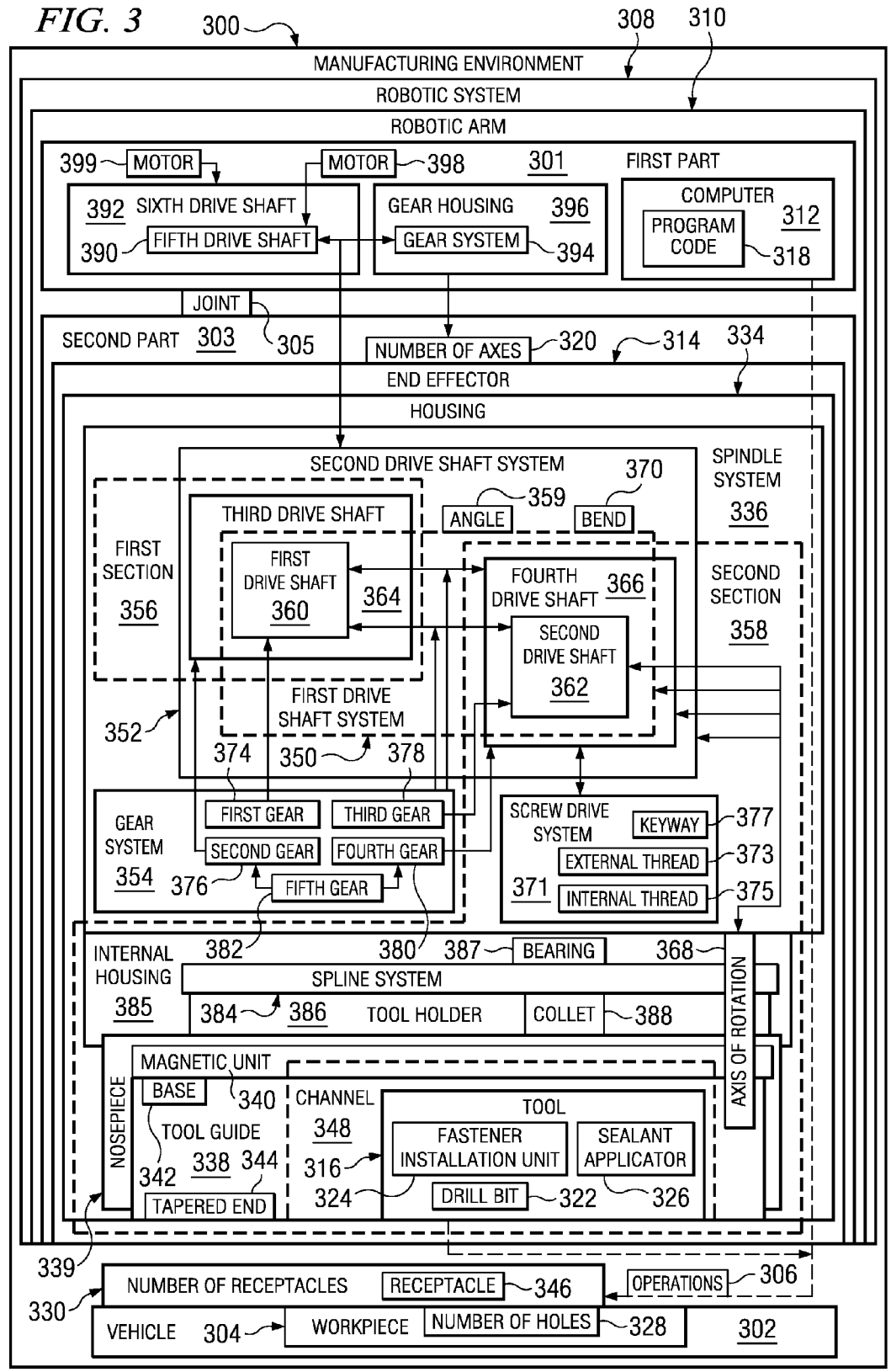
FIG. 3 is an illustration of a manufacturing environment in accordance with an advantageous embodiment.

With reference next to FIG. 3, an illustration of a manufacturing environment is depicted in accordance with an advantageous embodiment. In this illustrative example, manufacturing environment 300 may be an example of a manufacturing environment that may be used to perform component and subassembly manufacturing 106 as well as maintenance and service 114 in FIG. 1 on vehicle 302. Vehicle 302 may take the form of aircraft 200 in FIG. 2 in these illustrative examples.

In manufacturing environment 300, various operations may be performed on workpiece 304. Workpiece 304 may be, for example, without limitation, two or more parts and/or subassemblies for vehicle 302. For example, without limitation, workpiece 304 may be a wing panel and a number of ribs. In other advantageous embodiments, workpiece 304 may be a fuselage rib and a skin panel, a spar, a spar and rib, or some other combination of the parts for vehicle 302.

In these illustrative examples, operations 306 may be performed on workpiece 304 using robotic system 308. Operations 306 may be, for example, without limitation, drilling operations, sealing operations, fastener installation operations, and/or other suitable operations.

Robotic system 308, in this illustrative example, may include robotic arm 310, computer 312, end effector 314, tool 316, and/or other suitable components. In this illustrative example, robotic arm 310 may have first part 301, second part 303, and joint 305. First part 301 may be movably attached to second part 303 by joint 305. End effector 314 may be attached to first part 301 in this illustrative example.

In these illustrative examples, computer 312 may execute program code 318 to perform operations 306. Robotic arm 310 and end effector 314 may be moved about number of axes 320 to position tool 316 to perform operations 306. A number, as used herein, when referring to items, refers to one or more items. For example, without limitation, a number of axes may be one or more axes. In these illustrative examples, a number of axes may be six axes. Of course, some other number of axes may be used, depending on the particular implementation for robotic system 308.

In these illustrative examples, tool 316 may take various forms. For example, without limitation, tool 316 may be drill bit 322, fastener installation unit 324, sealant applicator 326, and/or some other suitable type of tool. For example, without limitation, when tool 316 takes the form of drill bit 322, robotic system 308 may position drill bit 322 to perform operations 306 to drill number of holes 328 in workpiece 304.

Additionally, number of receptacles 330 may be positioned on workpiece 304 in locations for number of holes 328. End effector 314 may engage number of receptacles 330 in performing operations 306 to drill number of holes 328. In these illustrative examples, number of receptacles 330 may be located in a "template" or some other material capable of being placed on workpiece 304 to provide a location for number of holes 328.

In this illustrative example, end effector 314 may comprise housing 334, spindle system 336, tool guide 338, and magnetic unit 340. Spindle system 336 may be located within housing 334 for end effector 314. Tool guide 338, nosepiece 339, and magnetic unit 340 may be associated with housing 334.

In these illustrative examples, a first component is considered to be associated with a second component by being secured to the second component, bonded to the second component, fastened to the second component, and/or connected to the second component in some other suitable manner. The first component may also be considered to be associated with the second component by being formed as a part of and/or an extension of the second component.

In these illustrative examples, tool guide 338 and magnetic unit 340 may be located within and/or part of nosepiece 339. Tool guide 338 may have base 342 and tapered end 344. Nosepiece 339 and tapered end 344 of tool guide 338 may be capable of engaging receptacle 346 in number of receptacles 330. Magnetic unit 340 may be adjacent to base 342. Magnetic unit 340 may touch base 342 or may be spaced apart from base 342. Further, magnetic unit 340 may be capable of magnetizing nosepiece 339. In these illustrative examples, channel 348 may extend through tool guide 338 and magnetic unit 340 in nosepiece 339. Channel 348 may be capable of receiving a tool.

Magnetic unit 340 may be made out of a material such as, for example, without limitation, neodymium, iron, boron, and/or some other suitable magnetic material. Nosepiece 339 may be made out of a magnetic material such as, for example, without limitation, iron and/or some other magnetic material. Further, in these examples, number of receptacles 330 may be made out of the same magnetic material as nosepiece 339. In other illustrative examples, number of receptacles 330 may be made out of another type of material other than that used for nosepiece 339.

In the depicted examples, spindle system 336 may comprise first drive shaft system 350, second drive shaft system 352, and gear system 354. Also, housing 334 may have first section 356 and second section 358. Second section 358 may extend at an angle from first section 356. The angle may be, for example, without limitation, around 90 degrees, around 120 degrees, or some other suitable angle. In these depicted examples, first drive shaft system 350 and second drive shaft system 352 may be positioned relative to each other around angle 359.

In these illustrative examples, angle 359 may be selected to be any suitable angle, for example, without limitation, about a 120 degree angle. An angle of 120 degrees may allow robotic system 308 to reach into corners bounded by three mutually perpendicular planes.

First drive shaft system 350 may comprise first drive shaft 360 and second drive shaft 362. Second drive shaft system 352 may comprise third drive shaft 364 and fourth drive shaft 366. First drive shaft 360 may be located in first section 356, second drive shaft 362 may be located in second section 358, third drive shaft 364 may be located in first section 356, and fourth drive shaft 366 may be located in second section 358.

The different drive shafts within spindle system 336 in first drive shaft system 350 and second drive shaft system 352 may include concentric drive shafts. In other words, one drive shaft may be located within another drive shaft. This concentric arrangement may include a configuration that allows both drive shafts to rotate independently of each other. Of course, depending on the particular implementation, spindle system 336 may include non-coaxial drive shafts. For example, drive shafts within first drive shaft system 350 and second drive shaft system 352 may contain drive shafts that may be parallel to each other rather than concentric.

For example, without limitation, in these illustrative examples, first drive shaft 360 may be located within third drive shaft 364 and may be rotatable within third drive shaft 364. Second drive shaft 362 may be located within fourth drive shaft 366 and may be rotatable within fourth drive shaft 366. In other words, first drive shaft 360 may be concentric with third drive shaft 364, and second drive shaft 362 may be concentric with fourth drive shaft 366. First drive shaft system 350 may be capable of rotating tool 316 about axis of rotation 368. Second drive shaft system 352 may be capable of moving tool 316 along axis of rotation 368. This movement along axis of rotation 368 may be referred to as a movement in an axial direction for axis of rotation 368.

Gear system 354 may connect first drive shaft system 350 to second drive shaft system 352 within end effector 314. More specifically, gear system 354 may connect first drive shaft 360 to second drive shaft 362. Gear system 354 may also connect third drive shaft 364 to fourth drive shaft 366. Gear system 354 may be located at bend 370 where second section 358 extends from first section 356 at angle 359.

In these illustrative examples, gear system 354 may comprise first gear 374, second gear 376, third gear 378, fourth gear 380, and fifth gear 382. First gear 374 may be connected to a first end of first drive shaft 360. Second gear 376 may be connected to a first end of third drive shaft 364. Third gear 378 may be connected to a first end of second drive shaft 362. First gear 374 may engage third gear 378 in this example. Fourth gear 380 may be connected to a first end of fourth drive shaft 366, and fifth gear 382 may be coupled to second gear 376 and fourth gear 380. Fifth gear 382 may translate rotational movement of second gear 376 into movement of fourth gear 380, and vice versa. In these examples, gears may be considered to be engaged to each other when a gear contacts another gear and can rotate in a manner that causes the other gear to rotate.

The second end of second drive shaft 362 may be capable of being coupled to tool 316. In these illustrative examples, spline system 384 may have a first end and a second end in which the first end of spline system 384 may be associated with a second end of second drive shaft 362. Second drive shaft 362 may be capable of rotating spline system 384 about axis of rotation 368. Further, spline system 384 also may be associated with internal housing 385. Fourth drive shaft 366 may be capable of moving spline system 384 axially along axis of rotation 368 by engaging internal housing 385.

In these illustrative examples, screw drive system 371 may translate rotational movement of fourth drive shaft 366 into linear movement of spline system 384 along axis of rotation 368. Screw drive system 371 may include external thread 373 associated with fourth drive shaft 366 and internal thread 375.

In these examples, external thread 373 may be a feed screw or lead screw such as, for example, without limitation, an acme threaded screw. Internal thread 375 may be a nut such as, for example, without limitation, an acme threaded nut. External thread 373 may rotate due to rotational movement of fourth drive shaft 366. Internal thread 375 may be prevented from rotating but may be allowed to move along axis of rotation 368. Further, internal thread 375 may move along axis of rotation 368 by means of keyway 377. As a result, a translation of rotational movement to axial movement may occur.

In these illustrative examples, internal thread 375 may be associated with internal housing 385. Internal housing 385 may be a housing located within housing 334. In these examples, internal housing 385 may be associated with internal thread 375, spline system 384, tool holder 386, and bearing 387. Bearing 387 may be, for example, without limitation, a combination thrust and radial bearing. Bearing 387 may support spline system 384 and allow the thrust produced by rotary motion of fourth drive shaft 366 to be translated into linear motion of internal housing 385 and spline system 384.

In other words, internal thread 375 and bearing 387 may translate rotational movement of fourth drive shaft 366 into linear movement of internal housing 385 along axis of rotation 368. This movement is an axial movement along axis of rotation 368 in these examples. In other words, screw drive system 371 may allow internal housing 385 and spline system 384 to move linearly along axis of rotation 368.

In these examples, spline system 384 may be connected to tool 316. Spline system 384 may be associated with tool holder 386, which may hold tool 316 in place for performing operations 306. Tool holder 386 may be, for example, without limitation, collet 388. In this manner, linear movement of internal housing 385 axially along axis of rotation 368 may result in linear movement of tool holder 386 and tool 316.

Further, robotic arm 310 may also include fifth drive shaft 390 and sixth drive shaft 392. Fifth drive shaft 390 may be located coaxially inside of sixth drive shaft 392 and may be rotatable within sixth drive shaft 392. In these illustrative examples, fifth drive shaft 390 and sixth drive shaft 392 may be considered a part of spindle system 336 even though they are located in robotic arm 310. In yet other advantageous embodiments, these two drive shafts may be considered separate components from spindle system 336.

Also, robotic arm 310 may include gear system 394. Gear system 394 may couple first drive shaft 360 to fifth drive shaft 390 and third drive shaft 364 to sixth drive shaft 392. Gear system 394 may be located within gear housing 396, which may rotate and/or pivot about number of axes 320 to move end effector 314 about number of axes 320.

In the different illustrative examples, gear system 354 and gear system 394 may provide a capability to rotate spindle system 336, in which spindle system 336 may have different angles or orientations with respect to axis of rotation 368 for tool 316. Further, movement of axis of rotation 368 may occur through movement of robotic arm 310, while maintaining a capability to rotate spindle system 336. Further, this configuration may also allow for motor 398 and motor 399 to be located externally from end effector 314 and not be directly connected to end effector 314.

In these illustrative examples, fifth drive shaft 390 may be connected to motor 398, and sixth drive shaft 392 may be connected to motor 399. These motors may be connected to robotic arm 310 in these examples. Motor 398 and motor 399 may be connected to robotic arm 310 rather than being associated with end effector 314 in the illustrative examples. In this manner, the size of end effector 314 may be reduced.

The illustration of manufacturing environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, robotic system 308 may include an additional number of robotic arms in addition to robotic arm 310. Further, in some advantageous embodiments, end effector 314 may not have bend 370 between first section 356 and second section 358. In yet other advantageous embodiments, additional gear systems may be present in addition to gear system 394 if robotic arm 310 has additional joints at which movement about an axis within number of axes 320 may be performed. If spindle system 336 extends through other portions of robotic arm 310 in which joints may be present, additional gear systems may be present for each joint to provide a capability for spindle system 336 to operate even with movement of robotic arm 310.

Further, in other advantageous embodiments, robotic system 308 may perform both drilling operations and fastener installation operations. Further, in still other advantageous embodiments, robotic system 308 also may gather data about operations 306 performed on workpiece 304. These different components may be integrated as part of the end effectors.

As yet another example, some of the gears in gear system 354 may be included as part of first drive shaft system 350 and/or second drive shaft system 352, rather than being considered part of gear system 354.

Figure 4:
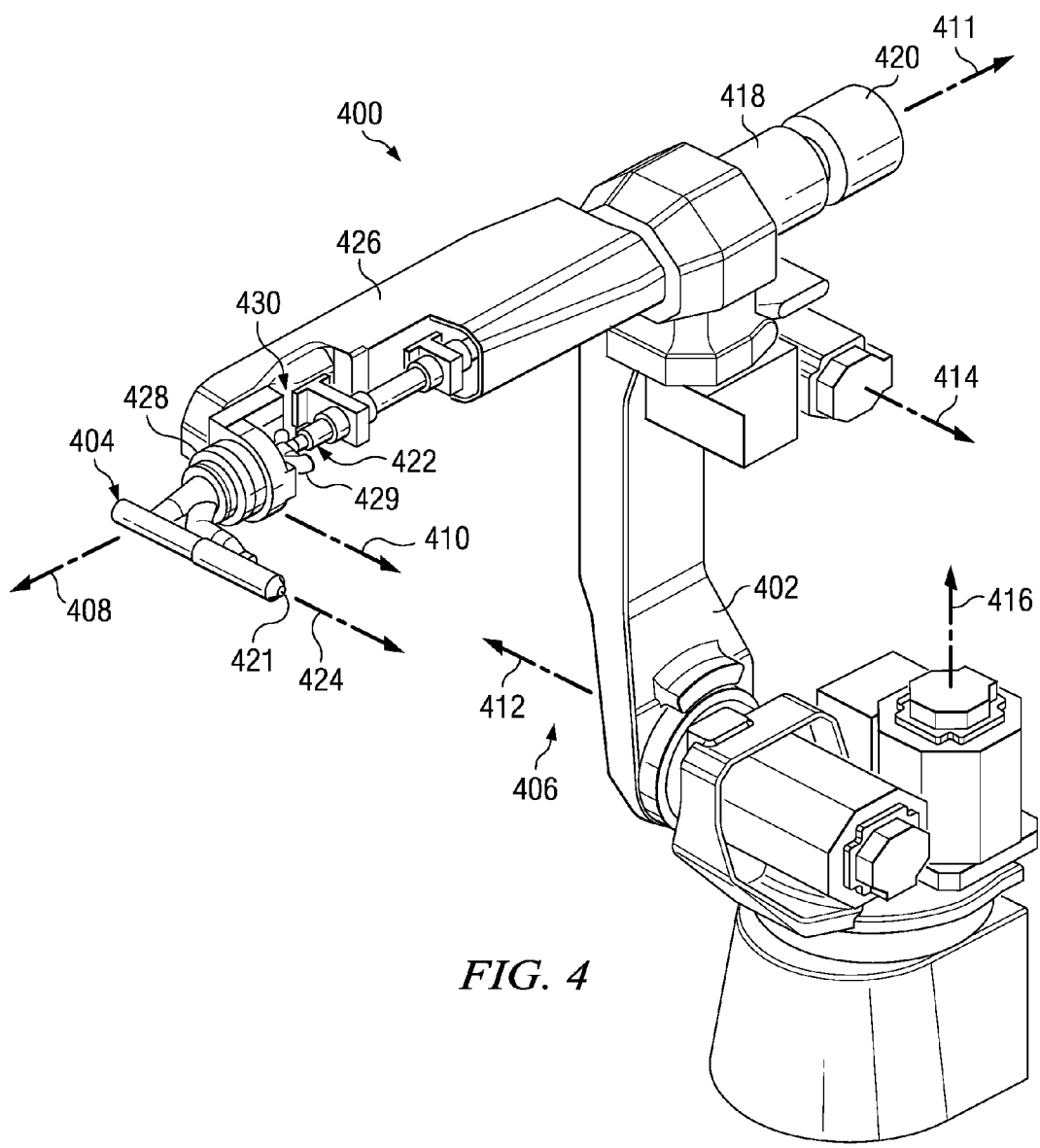
FIG. 4 is an illustration of a portion of a robotic system in accordance with an advantageous embodiment.

With reference now to FIG. 4, an illustration of a portion of a robotic system is depicted in accordance with an advantageous embodiment. In this illustrative example, a portion of robotic system 400 may be depicted as one example of a physical implementation for a portion of robotic system 308 in FIG. 3. In this illustrative example, robotic arm 402 and end effector 404 may be illustrated for robotic system 400. Other components such as, for example, without limitation, a computer, other robotic arms, and/or other suitable components are not shown for robotic system 400.

As depicted, robotic arm 402 in robotic system 400 may move in number of axes 406. Number of axes 406 includes axes 408, 410, 411, 412, 414, and 416. In this example, motor 418 and motor 420 is illustrated as being configured in tandem and/or series to rotate spindle system 422.

In this illustrative example, motor 418 may control the feed of drill bit 421 attached to end effector 404. Motor 420 may rotate the drill bit attached to end effector 404. As can be seen in this illustrative example, the rotation of drill bit 421 about axis of rotation 424 and movement of drill bit 421 along axis of rotation 424 may be controlled by motor 418 and motor 420. Motor 418 and motor 420 may not be aligned along axis of rotation 424 but along axis 411. In this illustrative example, a gear system (not shown) may allow for this configuration to rotate and/or move the drill bit.

Robotic arm 402 may include part 426, part 428, and joint 429. Part 426 of robotic arm 402 may rotate about axis 410. This rotation about axis 410 may be provided by gear system 430. Further, gear system 430 may allow this rotation to occur along with a capability to rotate and move the drill bit along axis of rotation 424.

Figure 5:
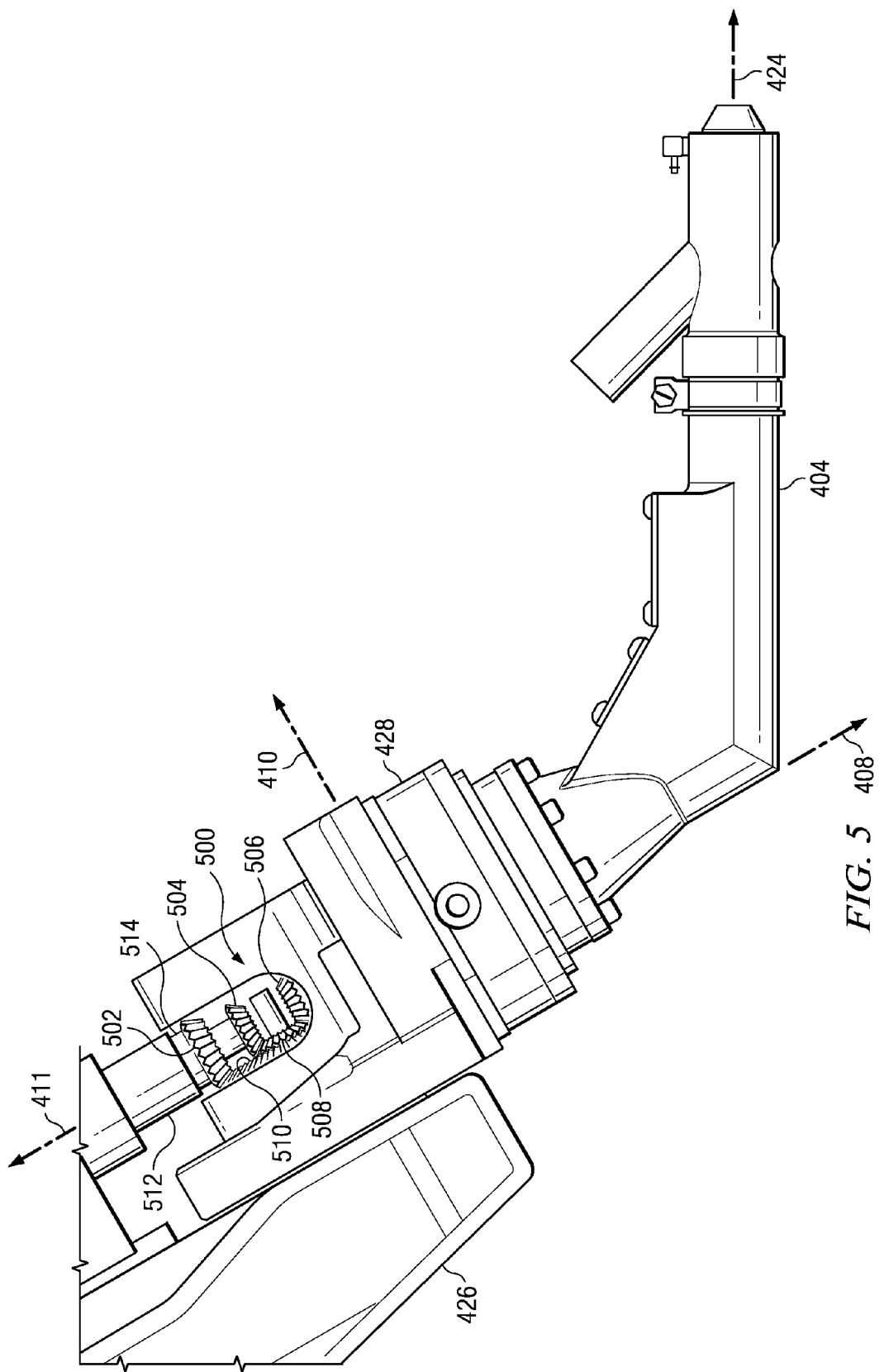
FIG. 5 is an illustration of a top view of a portion of a robotic system in accordance with an advantageous embodiment.

Turning now to FIG. 5, an illustration of a top view of a portion of a robotic system is depicted in accordance with an advantageous embodiment. In this illustrative example, a top view of a portion of robotic arm 402 in FIG. 4 is illustrated.

In this illustration, an enlarged view of part 426, part 428, and end effector 404 on robotic arm 402 is illustrated. As can be seen in this depicted example, gear system 500 may provide a capability to rotate a drill attached to end effector 404 when part 428 rotates relative to part 426 about axis 410. Further, gear system 500 also may provide a capability to rotate and move a drill bit in end effector 404 when end effector 404 rotates about axis 408.

In this illustrative example, gear system 500 includes gears 502, 504, 506, 508, and 510. As illustrated, gear 502 may engage gear 510. Gear 504 and gear 506 may engage gear 508. Gear 502 may be connected to drive shaft 512. Gear 504 may be connected to drive shaft 514. Drive shaft 512 and drive shaft 514 may be examples of sixth drive shaft 392 and fifth drive shaft 390, respectively. As can be seen, drive shaft 512 may be concentric to drive shaft 514. Drive shaft 514 may be rotatable within drive shaft 512. Further, drive shaft 512 and drive shaft 514 may lie along axis 411 in FIG. 4, along with motors 418 and 420.

Figure 6:
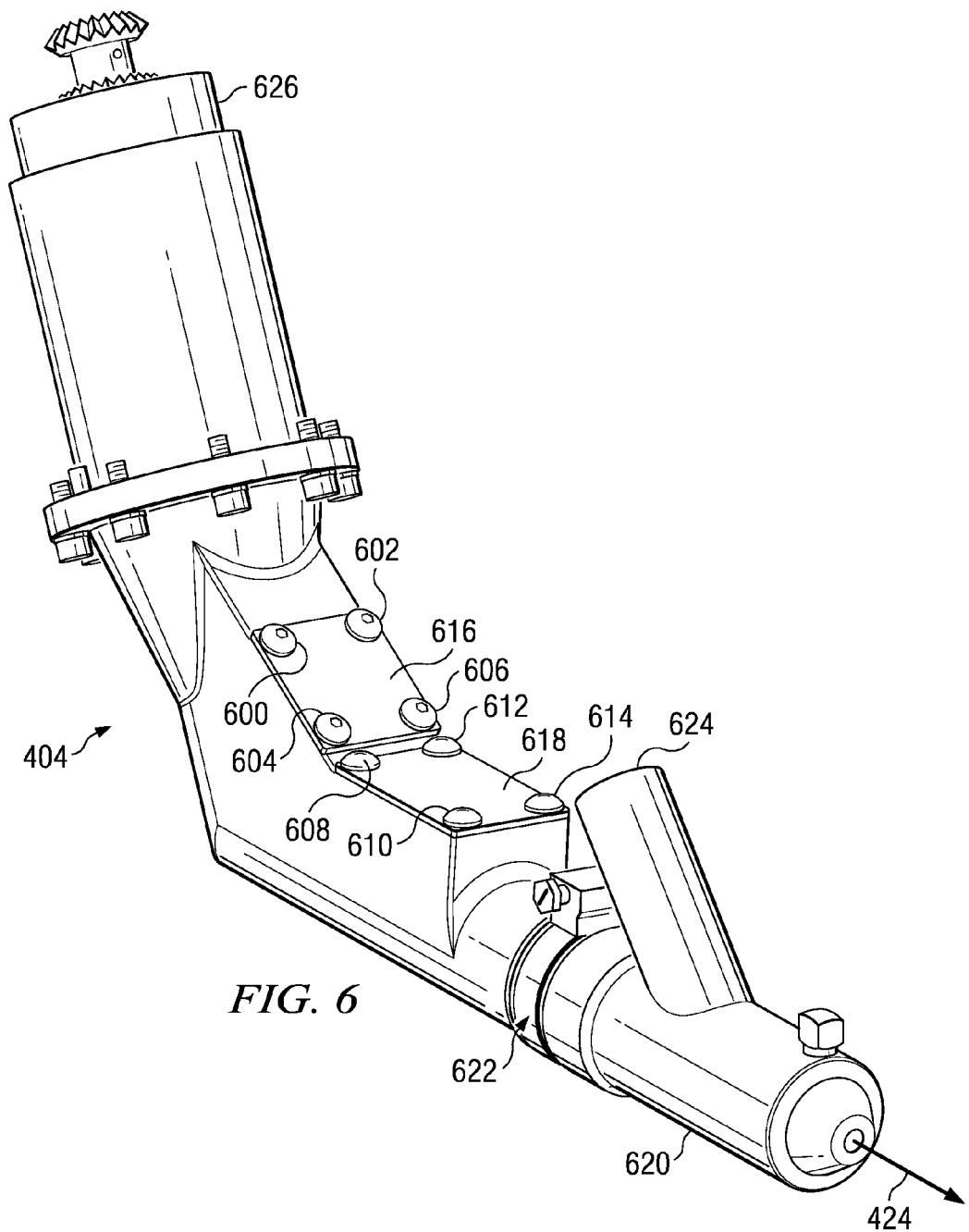
FIG. 6 is an illustration of a perspective view of an end effector in accordance with an advantageous embodiment.

Turning now to FIG. 6, an illustration of a perspective view of end effector 404 is depicted in accordance with an advantageous embodiment. As can be seen in this illustrative example, access to the interior of end effector 404 may occur with the removal of fasteners 600, 602, 604, 606, 608, 610, 612, and 614 and plates 616 and 618.

Also seen in this view is band clamp 622, which may allow for easy removal of nosepiece 620 from end effector 404. Additionally, port 624 may provide a port to attach a vacuum hose, which may be used to draw a vacuum to remove chips and/or other object that may enter end effector 404. End 626 of end effector 404 may be attached to a robotic arm, such as robotic arm 402 in FIG. 4, in these illustrative examples.

Figure 7:
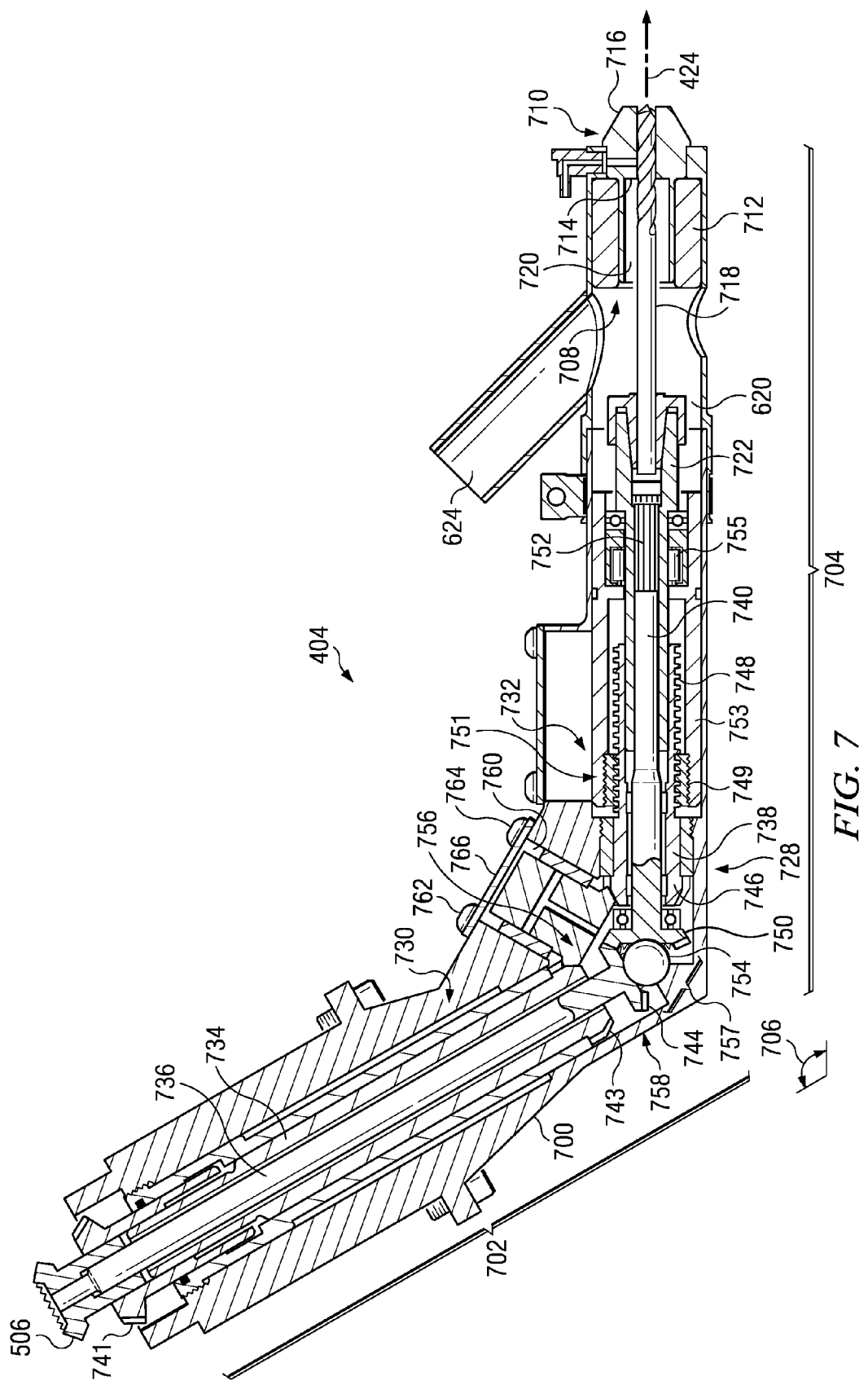
FIG. 7 is an illustration of a cross-sectional view of an end effector in accordance with an advantageous embodiment.

Turning now to FIG. 7, an illustration of a cross-sectional view of an end effector is depicted in accordance with an advantageous embodiment. In this illustrative example, end effector 404 is shown in a cross-sectional top view.

End effector 404 may include housing 700, which may have first section 702 and second section 704. In this example, second section 704 may extend from first section 702 at angle 706. In this example, angle 706 may be around 120 degrees. Of course, angle 706 may have other values such as, for example, 90 degrees, 145 degrees, or some other suitable value.

In this illustrative example, magnetic unit 708, nosepiece 620, and tool guide 710 may be associated with second section 704 of housing 700. Tool guide 710 may have base 714 and tapered end 716. A diameter of tool guide 710 may decrease from base 714 to tapered end 716. Magnetic unit 708 may take the form of cylindrical magnet 712 and may be located inside of second section 704.

In this illustrative example, cylindrical magnet 712 in magnetic unit 708 may be substantially adjacent to base 714 of tapered end 716. Cylindrical magnet 712 may magnetize nosepiece 620. As a result, nosepiece 620 may become attached or latched to another magnetic material, such as receptacle 346 in FIG. 3. Further, tool guide 710 may consist of a non-magnetic material to isolate drill bit 718 from cylindrical magnet 712 and from the magnetized nosepiece 620.

As can be seen in this example, drill bit 718 may extend through channel 720. Channel 720 may extend through tool guide 710 and cylindrical magnet 712 into second section 704 of housing 700.

Drill bit 718 may be received and/or secured within collet 722. Drill bit 718 may be an example of drill bit 322 in FIG. 3. Collet 722 may be part of spline system 752, which may be capable of moving drill bit 718 axially along axis of rotation 424.

In this illustrative example, spindle system 728 may include first drive shaft system 730 and second drive shaft system 732. First drive shaft system 730 may include drive shaft 734 and drive shaft 736. Second drive shaft system 732 may include drive shaft 738 and drive shaft 740.

In these illustrative examples, drive shaft 734 may have gear 741 and gear 506. Drive shaft 736 may have gear 506 and gear 744. Drive shaft 738 may have gear 746 and external thread 748. Drive shaft 740 may have gear 750. Further, drive shaft 740 may be associated with spline system 752.

External thread 748 may be one example of external thread 373 in screw drive system 371 in FIG. 3. Rotation of external thread 748 caused by rotation of drive shaft 738 may translate into linear movement of internal thread 749 by means of keyway 751. This linear movement of internal thread 749 may occur axially along axis of rotation 424. Internal thread 749 may be one example of internal thread 375 in screw drive system 371, and keyway 751 may be one example of keyway 377 in FIG. 3. Further, internal thread 749 may be associated with internal housing 753.

Internal housing 753 also may be associated with spline system 752, collet 722, and bearing 755. In these examples, bearing 755 may be a combination thrust and radial bearing. Drive shaft 738 may be capable of linearly moving spline system 752 by engaging and moving internal housing 753. Bearing 755 and internal thread 749 may allow rotational movement of drive shaft 738 about axis of rotation 424 to be translated into linear movement of internal housing 753 and spline system 752 along the axial direction for axis of rotation 424.

In these illustrative examples, ball bearing 754 provides a surface for engaging gear 744 and gear 750. Further, ball bearing 754 also may allow for maintaining correct minimum clearance 757 between gear 744 and gear 750.

Additionally, gear 756 also may be present. Rotation of gear 743 causes gear 756 to rotate, which in turn causes gear 746 to rotate. In this manner, rotation of drive shaft 734 causes rotation of drive shaft 738 about axis of rotation 424. Rotation of drive shaft 736 may cause rotation of drive shaft 740 using gear 744 and gear 750.

Rotation of drive shaft 738 may cause external thread 748 to move spline system 752 in the axial direction of axis of rotation 424. This, in turn, may move drill bit 718 axially along axis of rotation 424. Rotation of drive shaft 740 may also cause spline system 752 to rotate. The rotation of spline system 752 with collet 722 may cause drill bit 718 to rotate about axis of rotation 424 in these illustrative examples. Gear 506 and gear 741 may engage another set of gears with another set of drive shafts in an arm of a robotic system.

In this illustrative example, gear 743, gear 746, gear 744, gear 750, gear 756, and ball bearing 754 form gear system 758. In these illustrative examples, access to gear system 758 may be provided through access port 760. Access port 760 may be accessed by removing fastener 762, fastener 764, and cover plate 766.

Turning now to FIG. 8, an illustration of a perspective view of a gear system in an end effector is depicted in accordance with an advantageous embodiment. In this illustrative example, a perspective view of gear system 758 in end effector 404 is illustrated.

In this illustrative example, gear 743, gear 756, and gear 746 may be miter gears that have an angle of around 60 degrees, as depicted by angles 800 and 802. Gear 744 and gear 750 may also be miter gears in these examples. These gears may have an angle of around 120 degrees, as depicted by angle 804. Of course, other angles may be used, depending on the angle between first section 702 and second section 704. In other words, the angle of these sections may define the angle needed for the gears.

Turning now to FIG. 9, a more detailed illustration of a spline system within an end effector is depicted in accordance with an advantageous embodiment. In this illustrative example, spline system 752 may be illustrated in a perspective view. Spline system 752 may be external spline 900 and internal spline 902. External spline 900 may engage internal spline 902. External spline 900 may be slidably engaged with internal spline 902. External spline 900 may move along the direction of arrow 904. Further, rotation of shaft 740 may cause rotation of spline system 752 in the direction of arrow 906.

Figure 10:
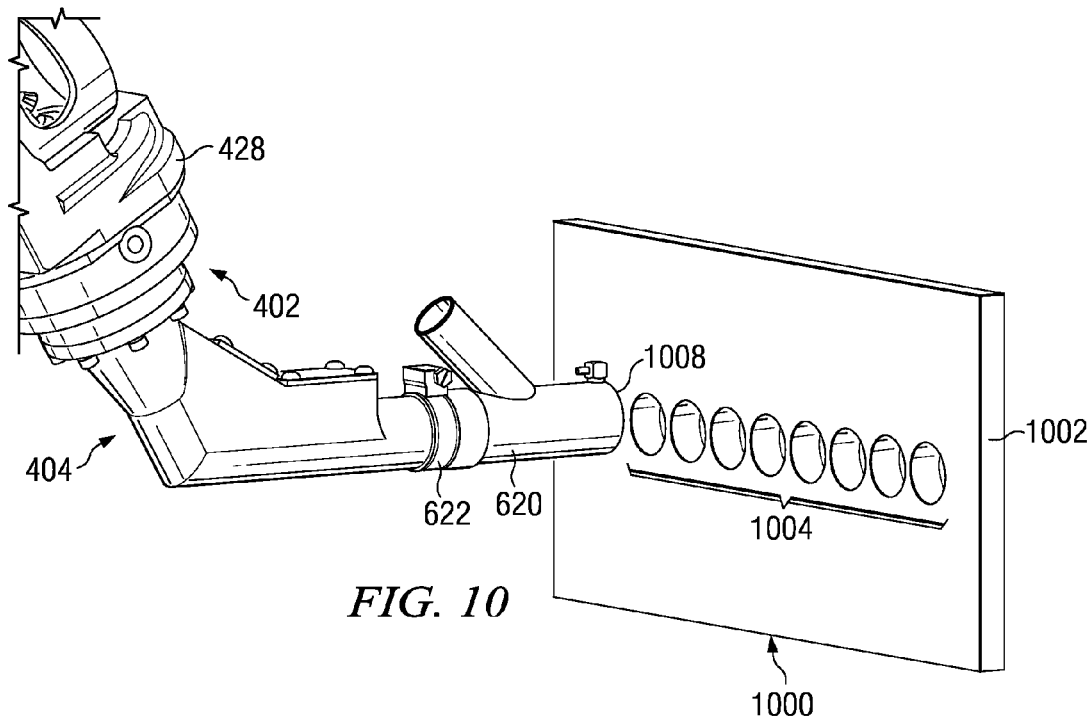
FIG. 10 is an illustration of a portion of a robotic arm positioned relative to receptacles for performing drilling operations in accordance with an advantageous embodiment.

Turning now to FIG. 10, an illustration of a portion of a robotic arm positioned relative to receptacles for performing drilling operations is depicted in accordance with an advantageous embodiment. In this illustrative example, a portion of robotic arm 402 with end effector 404 is depicted. End effector 404 may be positioned relative to drill blanket 1000. Drill blanket 1000 is an example of a template in this advantageous embodiment.

In this illustrative example, drill blanket 1000 may comprise layer of material 1002. Receptacles 1004 may be located within layer of material 1002. Receptacles 1004 may provide a receptacle or guide for tool guide 710 (not shown in this view) at end 1008 of end effector 404. Receptacles 1004 may provide a mechanism to position tool guide 710 to drill holes in a workpiece. Receptacles 1004 may be made of a magnetic material such as, for example, without limitation, iron.

In these illustrative examples, layer of material 1002 may be comprised of a flexible and/or compliant material. In yet other advantageous embodiments, layer of material 1002 may be a non-compliant or non-flexible material and may have a shape configured for placement on a workpiece. For example, layer of material 1002 may be, for example, without limitation, a nylon material, a composite material, a cloth material, aluminum, a fiberglass material, an epoxy layup, and/or some other suitable type of material.

Figure 11:
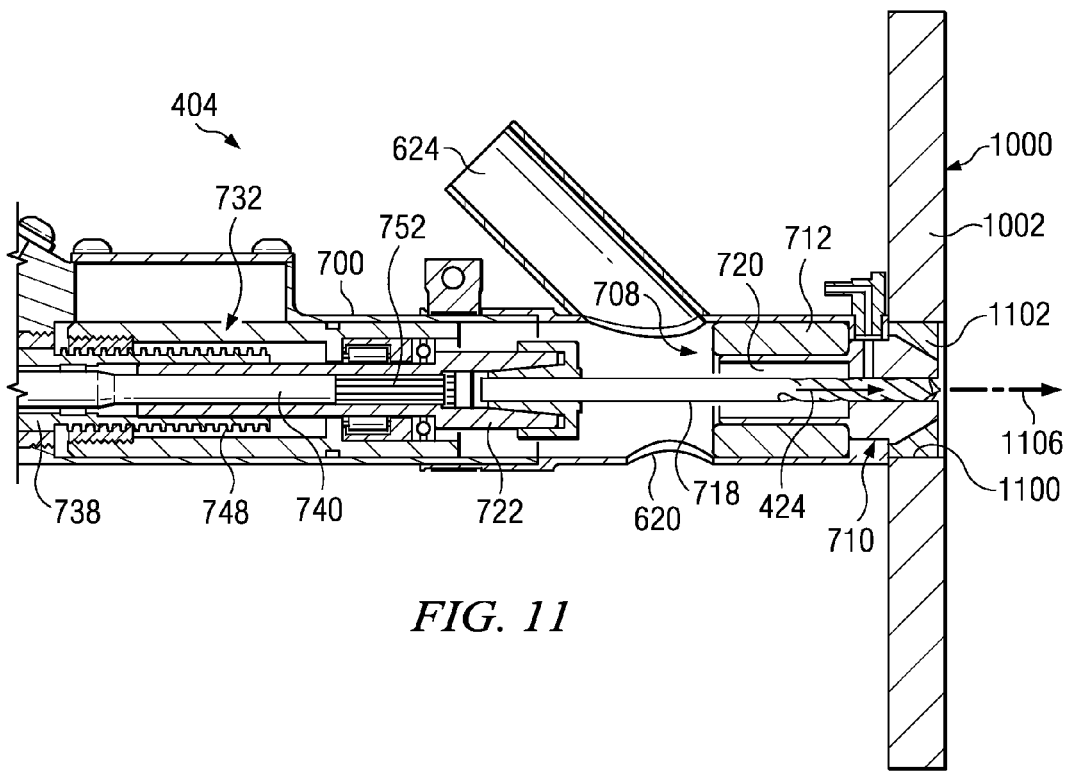
FIG. 11 is an illustration of a cross-sectional view of an end effector with a tool guide engaged in a receptacle in accordance with an advantageous embodiment.

Turning now to FIG. 11, an illustration of a cross-sectional view of an end effector with a tool guide engaged in a receptacle is depicted in accordance with an advantageous embodiment. In this illustrative example, a cross-sectional view of end effector 404 engaged in receptacle 1100 in drill blanket 1000 is illustrated.

As can be seen in this example, receptacle 1100 may be comprised of magnetic material 1102. Magnetic material 1102 may be, for example, without limitation, iron, nickel, cobalt, gadolinium, steel, and/or some other suitable material.

Nosepiece 620 may magnetically engage receptacle 1100 and may hold end effector 404 when in alignment about axis 1106. In these illustrative examples, nosepiece 620 in end effector 404 provides the greatest latching or attraction to receptacle 1100 when aligned about axis 1106. Axis 1106 may be substantially collinear with axis of rotation 424 in these examples. If end effector 404 is tilted away from axis 1106, nosepiece 620 may be more easily removed from receptacle 1100 as compared to when nosepiece 620 is aligned along axis 1106. In these illustrative examples, magnetic unit 708 may provide the magnetic force to cause nosepiece 620 to engage receptacle 1100.

Figure 12:
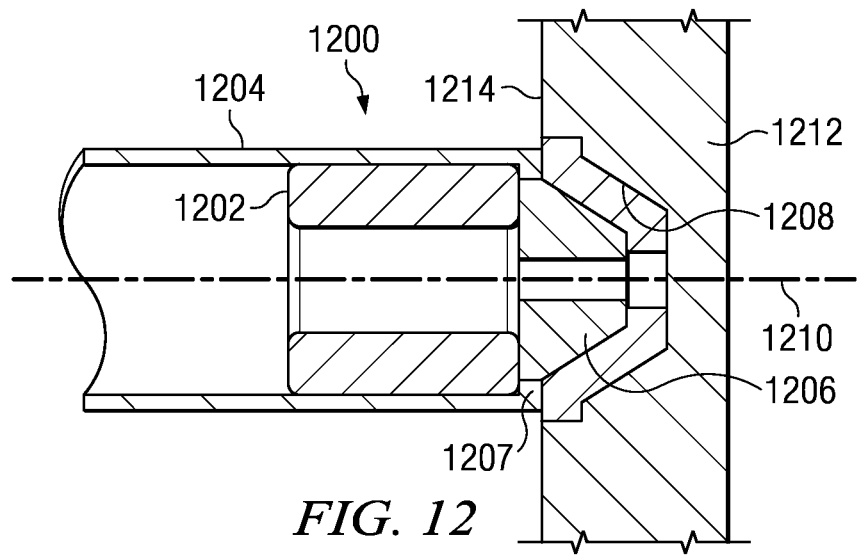
FIG. 12 is an illustration of alignment of an end effector within a receptacle in accordance with an advantageous embodiment.

Turning now to FIG. 12, an illustration of an alignment of an end effector within a receptacle is depicted in accordance with an advantageous embodiment. As can be seen in this illustrative example, end effector 1200 has magnetic unit 1202 located within housing 1204. Tool guide 1206 may be engaged or in contact with receptacle 1208.

In this illustrative example, end effector 1200 may be aligned along axis 1210. Axis 1210 may be substantially collinear with the axis of rotation for a drill bit, such as axis of rotation 424 for drill bit 718 in FIG. 7, in this example. In this configuration, end effector 1200 may be secured to receptacle 1208 to perform drilling operations on a workpiece under layer of material 1212 for drill blanket 1214. Nosepiece 1207 may be magnetically "latched" to receptacle 1208 to engage tool guide 1206 with receptacle 1208 in this example.

Figure 13:
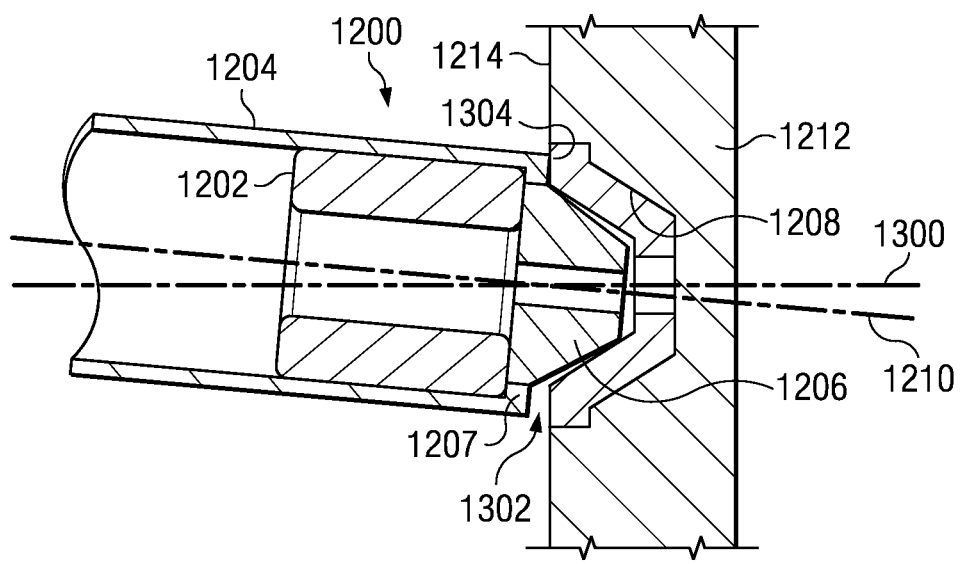
FIG. 13 is an illustration of a position for disengaging an end effector from a receptacle in accordance with an advantageous embodiment.

With reference now to FIG. 13, an illustration of a position for disengaging an end effector from a receptacle is depicted in accordance with an advantageous embodiment. As illustrated in this example, axis of rotation 1300 has been moved out of alignment from axis 1210 for receptacle 1208. In these examples, axis of rotation 1300 may be substantially the same as axis of rotation 424 in FIGS. 4-7. In this orientation, end effector 1200 has been "unlatched" from receptacle 1208. This tilt or change in orientation of end effector 1200 with respect to receptacle 1208 allows for easier removal of end effector 1200 from receptacle 1208 in this illustrative example.

In other words, the tilt or change in orientation of end effector 1200 may introduce air gap 1302 in the magnetic path between receptacle 1208 and nosepiece 1207. Air gap 1302 may decrease the magnetic attraction between receptacle 1208 and nosepiece 1207. Further, tilting end effector 1200 requires less force and provides mechanical leverage about pivot 1304 on nosepiece 1207.

Figure 14:
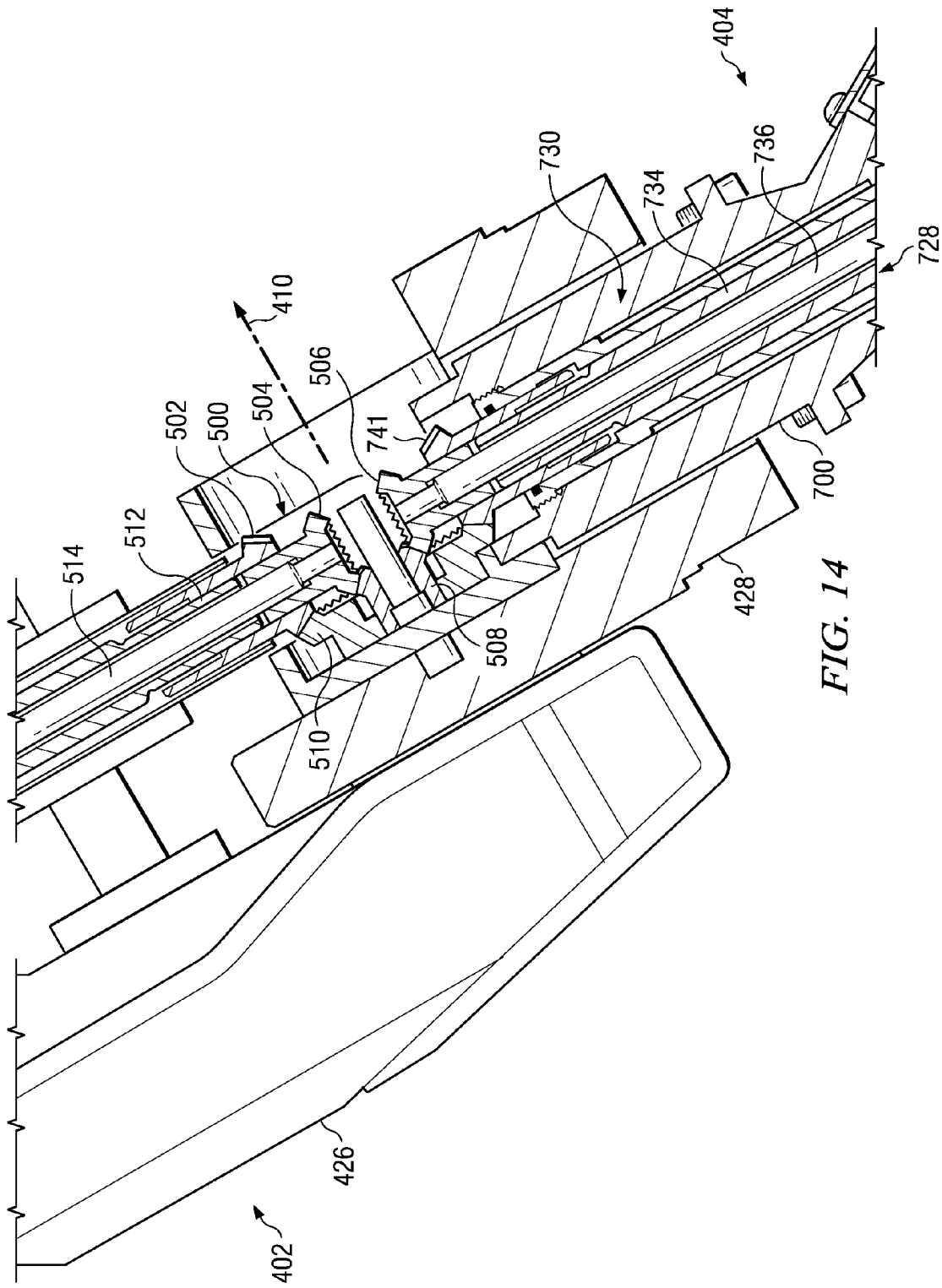
FIG. 14 is an illustration of a cross-sectional view of a robotic arm with an end effector in accordance with an advantageous embodiment.

Turning now to FIG. 14, an illustration of a cross-sectional view of a robotic arm with an end effector is depicted in accordance with an advantageous embodiment. In this illustrative example, a cross-sectional view of a portion of a robotic arm with end effector 404 is illustrated. As can be seen, part 428 may pivot about axis 410 while still providing a capability to rotate spindle system 728. An illustration of drive shafts 734 and 736 within end effector 404 may be seen in this illustrative view. Further, the engagement of drive shafts 734 and 736 to drive shafts 512 and 514 may be seen in this illustrative example.

Figure 15:
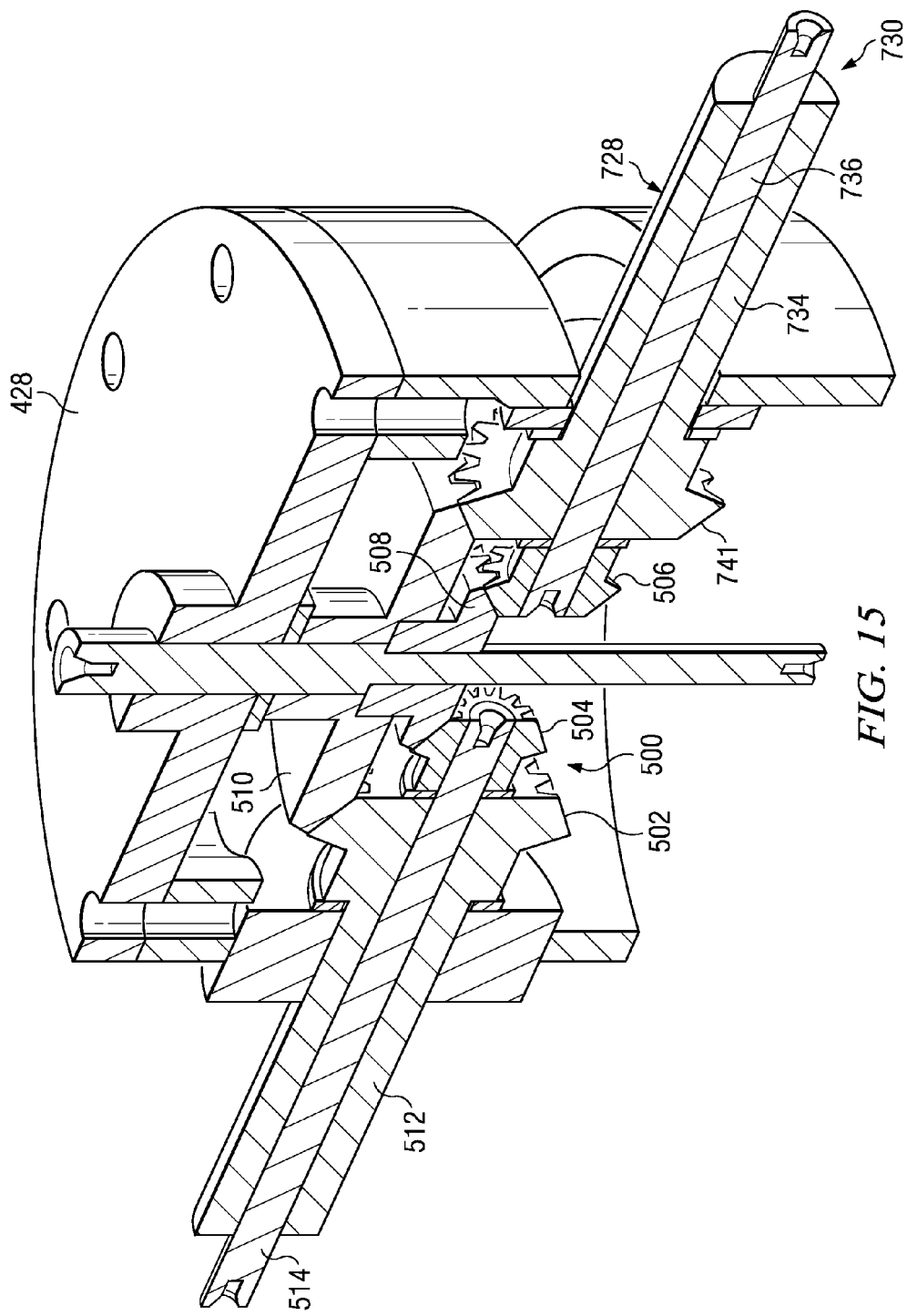
FIG. 15 is an illustration of a cross-sectional perspective view of a gear system for connecting drive shafts within a spindle system in accordance with an advantageous embodiment.

Turning now to FIG. 15, an illustration of a cross-sectional perspective view of a gear system for connecting drive shafts within a spindle system is depicted in accordance with an advantageous embodiment. In this illustrative example, gear system 500 connects drive shafts 512 and 514 with drive shafts 734 and 736 within spindle system 728, respectively.

Figure 16:
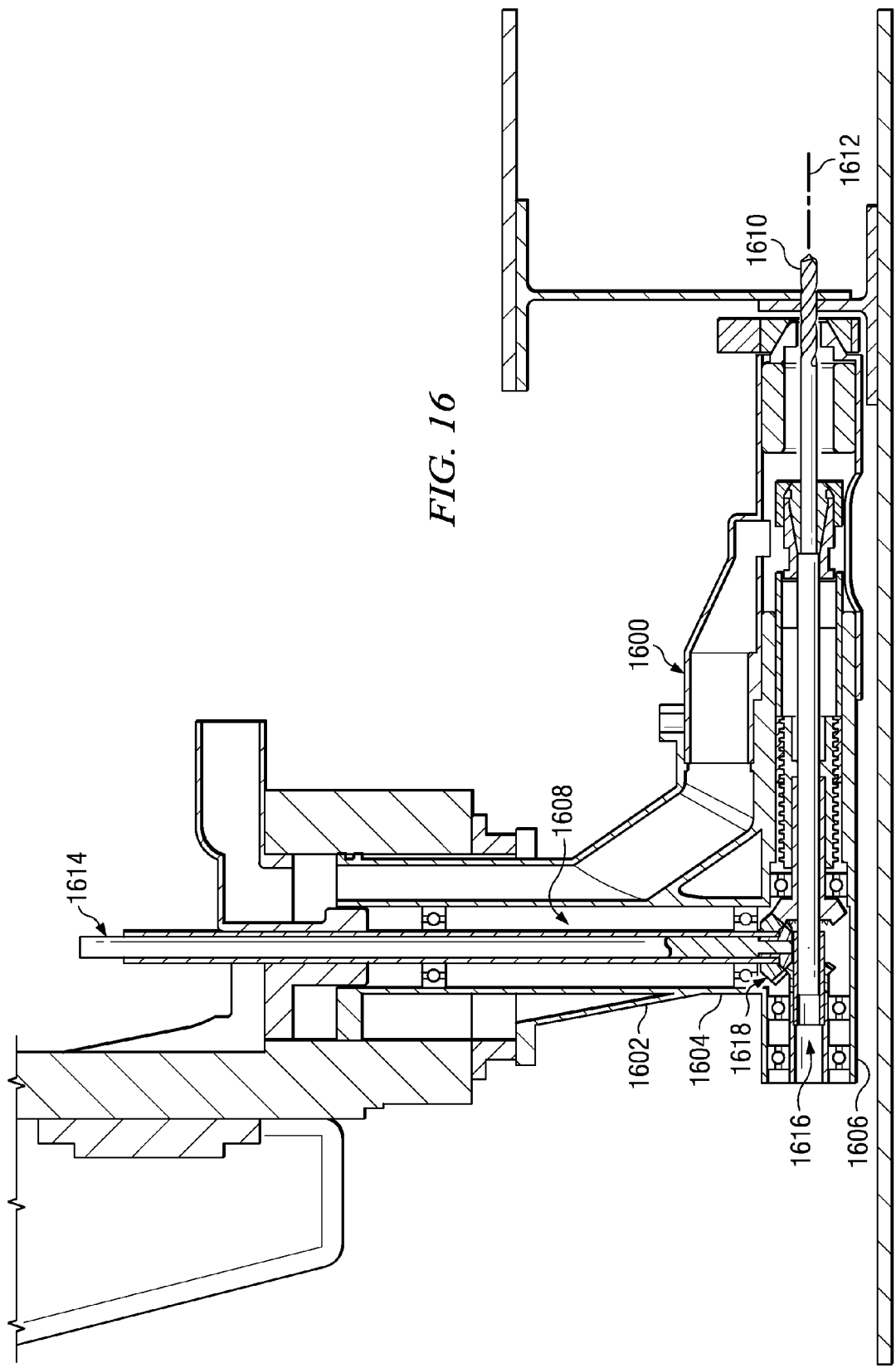
FIG. 16 is an illustration of a cross-sectional view of a portion of a robotic arm in an end effector in accordance with an advantageous embodiment.

Turning now to FIG. 16, an illustration of a cross-sectional view of a portion of a robotic arm in an end effector is depicted in accordance with an advantageous embodiment. In this illustrative example, end effector 1600 may be an example of another implementation for end effector 314 in FIG. 3.

In this illustrative example, an alternative configuration for an end effector is depicted. In this illustrative example, housing 1602 for end effector 1600 may have section 1604 and section 1606. In this example, section 1606 may extend from section 1604 at an angle of around 90 degrees. Spindle system 1608 may be capable of rotating drill bit 1610 about axis 1612 and moving drill bit 1610 in an axial direction along axis 1612. Spindle system 1608 may include first drive shaft system 1614 and second drive shaft system 1616.

In this configuration, gear system 1618 within spindle system 1608 also may be configured at alternative angles. The gears within gear system 1618 may be configured at angles other than, for example, without limitation, angles 800, 802, and 804 for gear system 758 as depicted in FIG. 8. For example, gear system 1618 may have gears configured at angles of around 45 degrees and around 90 degrees. In other advantageous embodiments, the sections of the end effector may be at angles other than around 90 degrees or around 120 degrees.

Figure 17:
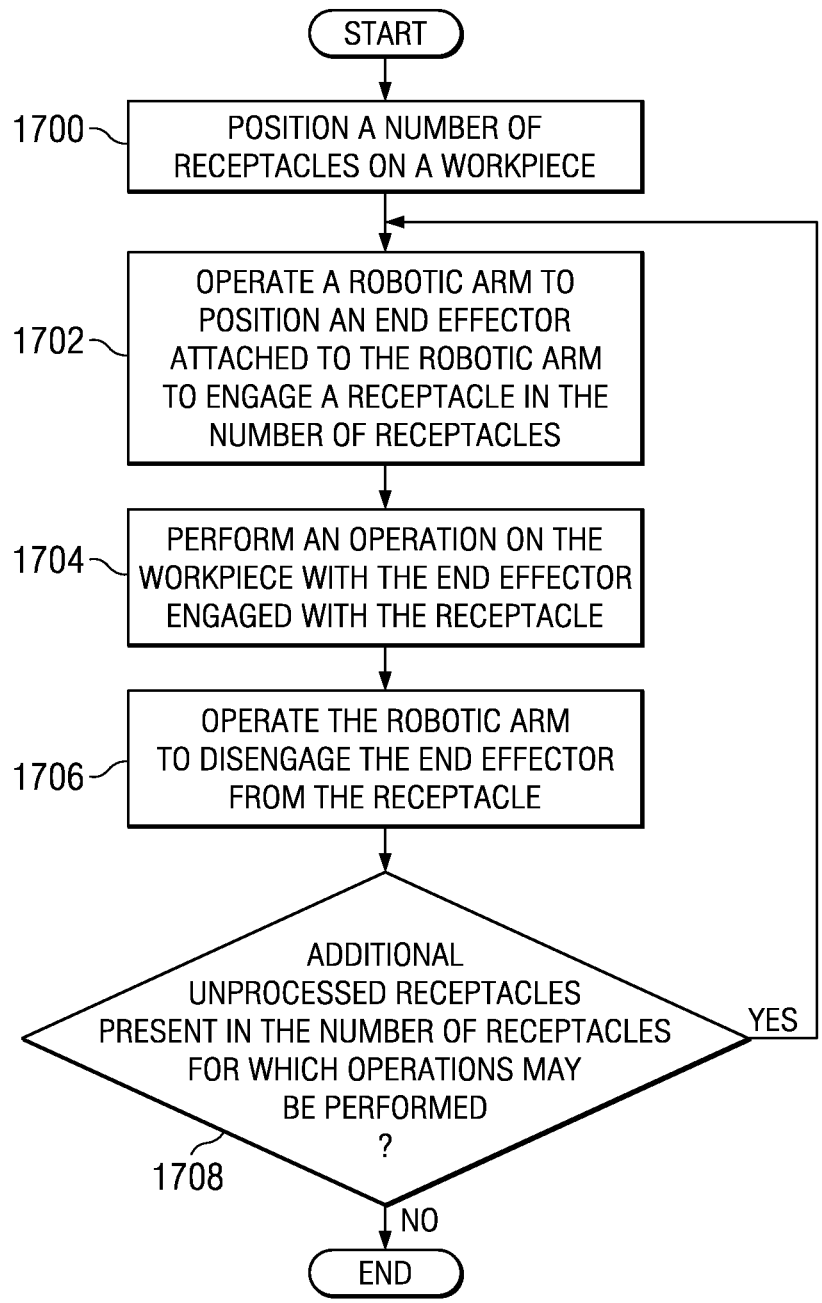
FIG. 17 is an illustration of a flowchart of a process for performing an operation on a workpiece in accordance with an advantageous embodiment.

Turning now to FIG. 17, an illustration of a flowchart of a process for performing an operation on a workpiece is depicted in accordance with an advantageous embodiment. The process illustrated in FIG. 17 may be implemented in manufacturing environment 300 to perform operations, such as operations 306 in FIG. 3.

The process may begin by positioning number of receptacles 330 on workpiece 304 (operation 1700). These receptacles may be placed by positioning a layer of material containing number of receptacles 330 on workpiece 304.

The process may operate robotic arm 310 to position end effector 314 attached to robotic arm 310 to engage receptacle 346 in number of receptacles 330 (operation 1702). The process may then perform an operation in operations 306 on workpiece 304 with end effector 314 engaged with receptacle 346 (operation 1704). The operation may be, for example, a drilling operation, a sealing operation, a fastener installation operation, or some other suitable operation.

Thereafter, the process may operate robotic arm 310 to disengage end effector 314 from receptacle 346 (operation 1706). A determination may be made as to whether additional unprocessed receptacles may be present in number of receptacles 330 for which operations 306 may be performed (operation 1708). If additional operations 306 are to be performed, the process may return to operation 1702 to select another unprocessed receptacle from number of receptacles 330. Otherwise, the process may terminate.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

For example, in some advantageous embodiments, operation 1700 may be unnecessary. Depending on the particular implementation, receptacles may be unnecessary to provide guides or locations for performing drilling operations. Further, in some advantageous embodiments, more than one operation may be performed in operation 1704. For example, a hole may be drilled and then a fastener may be installed during this operation.

The description of the different advantageous embodiments has been presented for purposes of illustration and description, and it is not intended to be exhaustive or limited to the embodiments in the form disclosed. Many modifications and variations will be apparent to those of ordinary skill in the art.

Although the different advantageous embodiments have been described with respect to aircraft, the different advantageous embodiments also recognize that some advantageous embodiments may be applied to other types of platforms. For example, without limitation, other advantageous embodiments may be applied to a mobile platform, a stationary platform, a land-based structure, an aquatic-based structure, a space-based structure, and/or some other suitable object. More specifically, the different advantageous embodiments may be applied to, for example, without limitation, a submarine, a bus, a personnel carrier, a tank, a train, an automobile, a spacecraft, a space station, a satellite, a surface ship, a power plant, a dam, a manufacturing facility, a building, and/or some other suitable object.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a housing, wherein the housing has a first section and a second section, wherein the second section extends at an angle from the first section and further comprising:
a first drive shaft system located within the housing, wherein the first drive shaft system has a first drive shaft located within the first section and a second drive shaft located within the second section;
a second drive shaft system located within the housing, wherein the second drive shaft system has a third drive shaft located within the first section and a fourth drive shaft located within the second section;
a gear system located in the housing, wherein the gear system couples the first drive shaft to the second drive shaft and the third drive shaft to the fourth drive shaft, wherein the first drive shaft system is configured to rotate the tool around the axis of rotation and the second drive shaft system is configured to move the tool along an axial direction for the axis of rotation;
a spindle system located in the housing, wherein the spindle system is configured to rotate a tool about an axis of rotation;
a tool guide associated with the housing, wherein the tool guide is configured to engage a receptacle at a location on a workpiece; and
a magnetic unit associated with the housing, wherein the magnetic unit is configured to secure the tool guide in the receptacle when the tool guide is engaged with the receptacle.

2. The apparatus of claim 1 further comprising:
a nosepiece configured to be attached to the housing, wherein the tool guide is attached to the nosepiece and the magnetic unit is located in the nosepiece, and wherein the nosepiece magnetically attaches to the receptacle to engage the tool guide with the receptacle.

3. The apparatus of claim 1, wherein the tool guide has a base and a tapered end, the tapered end is configured to engage the receptacle, the magnetic unit is adjacent to the base, a channel extends through the tool guide and the magnetic unit, and the channel is configured to receive the tool.

4. The apparatus of claim 1, wherein the first drive shaft is concentric with the third drive shaft and the second drive shaft is concentric with the fourth drive shaft and wherein the first drive shaft is rotatable within the third drive shaft, and the second drive shaft is rotatable within the fourth drive shaft.

5. The apparatus of claim 1, wherein the gear system comprises:
a first gear connected to a first end of the first drive shaft;
a second gear connected to a first end of the third drive shaft;
a third gear connected to a first end of the second drive shaft;
a fourth gear connected to a first end of the fourth drive shaft; and
a fifth gear, wherein the first gear is coupled to the third gear, and the fifth gear is coupled to the second gear and the fourth gear.

6. The apparatus of claim 5, wherein a second end of the second drive shaft is configured to be coupled to the tool.

7. The apparatus of claim 6 further comprising:
a spline system having a first end and a second end, wherein the first end of the spline system is connected to the second end of the second drive shaft and to a second end of the fourth drive shaft, wherein the second drive shaft is configured to rotate the spline system about the axis of rotation and the fourth drive shaft is configured to move the spline system along the axis of rotation.

8. The apparatus of claim 7 further comprising:
a collet connected to the second end of the spline system, wherein the collet is configured to receive and hold the tool.

9. The apparatus of claim 1 further comprising:
a first motor connected to the first drive shaft system, wherein the first motor is configured to rotate the first drive shaft and the second drive shaft; and
a second motor connected to the second drive shaft system, wherein the second motor is configured to rotate the third drive shaft and the fourth drive shaft.

10. The apparatus of claim 9, wherein the first motor and the second motor are located on a robotic arm.

11. The apparatus of claim 1 further comprising:
a fifth drive shaft;
a sixth drive shaft, wherein the fifth drive shaft is located inside the sixth drive shaft; and
a second gear system coupling the first drive shaft to the fifth drive shaft and coupling the third drive shaft to the sixth drive shaft.

12. The apparatus of claim 11 further comprising:
a structure, wherein the fifth drive shaft and the sixth drive shaft are located in the structure, wherein the housing is moveably attached to the structure.

13. The apparatus of claim 1 further comprising:
a robotic arm having a first part, a second part, and a joint, wherein the first part is moveably attached to the second part at the joint; and
a gear system connecting drive shafts to each other in the spindle system at the joint, wherein the spindle system is configured to rotate the tool around the axis of rotation and is configured to move the tool along an axial direction for the axis of rotation during movement of the first part.

14. The apparatus of claim 1, wherein the workpiece is for a platform selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a manufacturing facility, and a building.

15. A drilling apparatus for drilling holes in a workpiece for an aircraft, wherein the drilling apparatus comprises:
a housing, wherein the housing has a first section and a second section, wherein the second section extends at an angle from the first section;
a spindle system located in the housing, wherein the spindle system is configured to rotate a drill bit about an axis of rotation;
a nosepiece configured to be attached to the housing;
a tool guide associated with the housing, wherein the tool guide has a base and a tapered end, wherein the tapered end is configured to engage a receptacle in a location on the workpiece;
a magnetic unit associated with the housing, wherein the magnetic unit is configured to secure the nosepiece onto the receptacle when the tool guide is engaged with the receptacle, wherein the tool guide is attached to the nosepiece and the magnetic unit is located in the nosepiece, and wherein the magnetic unit is adjacent to the base;
a channel extending through the tool guide and the magnetic unit, wherein the channel is configured to receive the drill bit;
a first drive shaft system located within the housing, wherein the first drive shaft system has a first drive shaft located within a first section and a second drive shaft located within a second section;
a second drive shaft system located within the housing, wherein the second drive shaft system has a third drive shaft with the first drive shaft located within the third drive shaft, and a fourth drive shaft with the second drive shaft located within the fourth drive shaft, wherein the first drive shaft is rotatable within the third drive shaft, and the second drive shaft is rotatable within the fourth drive shaft;
a first gear system located in the housing, wherein the first gear system couples the first drive shaft to the second drive shaft and the third drive shaft to the fourth drive shaft, wherein the first drive shaft system is configured to rotate the drill bit around the axis of rotation, and the second drive shaft system is configured to move the drill bit along the axis of rotation, wherein the first gear system comprises:
a first gear connected to a first end of the first drive shaft;
a second gear connected to a first end of the third drive shaft;
a third gear connected to a first end of the second drive shaft;
a fourth gear connected to a first end of the fourth drive shaft; and
a fifth gear, wherein the first gear is coupled to the third gear, and the fifth gear is coupled to the second gear and the fourth gear, wherein a second end of the second drive shaft is configured to be coupled to the drill bit;
a spline system having a first end and a second end, wherein the first end of the spline system is connected to the second end of the second drive shaft and the second end of the spline system is connected to an internal housing, wherein the second drive shaft is configured to rotate the spline system about the axis of rotation and the fourth drive shaft is configured to move the internal housing to move the spline system along the axis of rotation;
a collet connected to the second end of the spline system, wherein the collet is configured to receive and hold the drill bit;
a fifth drive shaft;
a sixth drive shaft, wherein the fifth drive shaft is located inside the sixth drive shaft;
a second gear system coupling the first drive shaft to the fifth drive shaft, and coupling the third drive shaft to the sixth drive shaft;
a robotic arm, wherein the fifth drive shaft and the sixth drive shaft are located in the robotic arm;
a first motor connected to the fifth drive shaft, wherein the first motor is configured to rotate the first drive shaft and the second drive shaft; and
a second motor connected to the sixth drive shaft, wherein the second motor is configured to rotate the third drive shaft and the fourth drive shaft, wherein the first motor and the second motor are located on the robotic arm.

16. An apparatus comprising:
a housing having a first section and a second section, wherein the second section extends at an angle from the first section;
a first drive shaft system located within the housing, wherein the first drive shaft system has a first drive shaft located within the first section and a second drive shaft located within the second section;
a second drive shaft system located within the housing, wherein the second drive shaft system has a third drive shaft with the first drive shaft located within the third drive shaft, and a fourth drive shaft with the second drive shaft located within the fourth drive shaft, wherein the first drive shaft is rotatable within the third drive shaft, and the second drive shaft is rotatable within the fourth drive shaft; and
a gear system located in the housing, wherein the gear system couples the first drive shaft to the second drive shaft and the third drive shaft to the fourth drive shaft, wherein the first drive shaft system is configured to rotate a tool around an axis of rotation and the second drive shaft system is configured to move the tool along the axis of rotation.

17. The apparatus of claim 16, wherein the gear system comprises:
a first gear connected to a first end of the first drive shaft;
a second gear connected to a first end of the third drive shaft;
a third gear connected to a first end of the second drive shaft;
a fourth gear connected to a first end of the fourth drive shaft; and
a fifth gear, wherein the first gear is coupled to the third gear, and the fifth gear is coupled to the second gear and the fourth gear.

18. The apparatus of claim 17, wherein a second end of the second drive shaft is configured to be coupled to the tool.

19. The apparatus of claim 18 further comprising:
a spline system having a first end and a second end, wherein the first end of the spline system is connected to the second end of the second drive shaft, and the second end of the spline system is connected to an internal housing, wherein the second drive shaft is configured to rotate the spline system about the axis of rotation and the fourth drive shaft is configured to move the internal housing to move the spline system along the axis of rotation.

20. The apparatus of claim 19 further comprising:
a collet connected to the second end of the spline system, wherein the collet is configured to receive and hold the tool.

21. The apparatus of claim 19 further comprising:
a screw drive system coupled to the fourth drive shaft, wherein the screw drive system is configured to convert rotary motion from the fourth drive shaft to a linear motion of the internal housing to move the spline system along the axis of rotation.

22. The apparatus of claim 16 further comprising:
a first motor connected to the first drive shaft system, wherein the first motor is configured to rotate the first drive shaft and the second drive shaft; and
a second motor connected to the second drive shaft system, wherein the second motor is configured to rotate the third drive shaft and the fourth drive shaft.

23. The apparatus of claim 16, wherein the gear system is a first gear system and further comprising:
a fifth drive shaft;
a sixth drive shaft, wherein the fifth drive shaft is located inside the sixth drive shaft; and
a second gear system coupling the first drive shaft to the fifth drive shaft and coupling the third drive shaft to the sixth drive shaft.

24. The apparatus of claim 16 further comprising:
a first motor connected to a fifth drive shaft; and
a second motor connected to a sixth drive shaft, wherein the first motor is configured to rotate the fifth drive shaft, the second motor is configured to rotate the sixth drive shaft, wherein rotation of the fifth drive shaft causes the tool to rotate about the axis of rotation, and rotation of the sixth drive shaft causes the tool to move along the axis of rotation.

25. The apparatus of claim 24 further comprising:
a structure, wherein the fifth drive shaft and the sixth drive shaft are located in the structure, wherein the housing is moveably attached to the structure.

26. The apparatus of claim 25, wherein the structure is a robotic arm and wherein the robotic arm is configured to receive the housing.

27. The apparatus of claim 16, wherein the gear system is a first gear system and further comprising:
a robotic arm having a first part, a second part, and a joint, wherein the first part is moveably attached to the second part at the joint; and
a second gear system connecting a fifth drive shaft to the first drive shaft and a sixth drive shaft to the third drive shaft.

28. A drilling apparatus for drilling holes in a workpiece for an aircraft, the drilling apparatus comprising:
a housing having a first section and a second section, wherein the second section extends at an angle from the first section;
a first drive shaft system located within the housing, wherein the first drive shaft system has a first drive shaft located within the first section and a second drive shaft located within the second section;
a second drive shaft system located within the housing, wherein the second drive shaft system has a third drive shaft with the first drive shaft located within the third drive shaft, and a fourth drive shaft with the second drive shaft located within the fourth drive shaft, wherein the first drive shaft is rotatable within the third drive shaft, and the second drive shaft is rotatable within the fourth drive shaft;
a spindle system located in the housing, wherein the spindle system is configured to rotate a tool about an axis of rotation;
a nosepiece associated with the housing;
a tool guide associated with the housing, wherein the tool guide is configured to engage a receptacle at a location on a workpiece;
a magnetic unit associated with the housing, wherein the magnetic unit is configured to secure the nosepiece in the receptacle when the tool guide is engaged with the receptacle; and
a first gear system located in the housing, wherein the first gear system couples the first drive shaft to the second drive shaft and the third drive shaft to the fourth drive shaft, wherein the first drive shaft system is configured to rotate a drill bit around an axis of rotation, and the second drive shaft system is configured to move the drill bit along the axis of rotation, wherein the first gear system comprises:
a first gear connected to a first end of the first drive shaft;
a second gear connected to a first end of the third drive shaft;
a third gear connected to a first end of the second drive shaft;
a fourth gear connected to a first end of the fourth drive shaft; and
a fifth gear, wherein the first gear is coupled to the third gear, and the fifth gear is coupled to the second gear and the fourth gear;
a spline system having a first end and a second end, wherein the first end of the spline system is connected to a second end of the second drive shaft and the second end of the spline system is connected to an internal housing;
the internal housing, wherein the second drive shaft is configured to rotate the spline system about the axis of rotation, and the fourth drive shaft is configured to move the internal housing to move the spline system along the axis of rotation;
a collet connected to the second end of the spline system, wherein the collet is configured to receive and hold the drill bit;
a fifth drive shaft;
a sixth drive shaft, wherein the fifth drive shaft is located inside the sixth drive shaft;
a second gear system coupling the first drive shaft to the fifth drive shaft and coupling the third drive shaft to the sixth drive shaft;
a first motor connected to the fifth drive shaft, wherein the first motor is configured to rotate the first drive shaft and the fifth drive shaft;
a second motor connected to the sixth drive shaft, wherein the second motor is configured to rotate the third drive shaft and the sixth drive shaft; and
a robotic arm, wherein the fifth drive shaft and the sixth drive shaft are located in the robotic arm, wherein the robotic arm is configured to receive the housing.

* * * * *